US011172420B2

(12) United States Patent
Fan et al.

(10) Patent No.: US 11,172,420 B2
(45) Date of Patent: Nov. 9, 2021

(54) METHODS AND DEVICES FOR HANDOVER IN A WIRELESS COMMUNICATION NETWORK

(71) Applicant: Telefonaktiebolaget LM Ericsson (publ), Stockholm (SE)

(72) Inventors: Rui Fan, Beijing (CN); Andres Reial, Malmö (SE); Johan Rune, Lidingö (SE); Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/895,341

(22) Filed: Jun. 8, 2020

(65) Prior Publication Data

US 2020/0305045 A1 Sep. 24, 2020

Related U.S. Application Data

(63) Continuation of application No. 15/524,293, filed as application No. PCT/SE2017/050060 on Jan. 23, 2017, now Pat. No. 10,716,042.

(51) Int. Cl.
*H04W 36/08* (2009.01)
*H04B 7/06* (2006.01)
(Continued)

(52) U.S. Cl.
CPC .......... *H04W 36/08* (2013.01); *H04B 7/0695* (2013.01); *H04W 36/0022* (2013.01);
(Continued)

(58) Field of Classification Search
None
See application file for complete search history.

(56) References Cited

U.S. PATENT DOCUMENTS

2010/0330999 A1 12/2010 Larsson et al.
2012/0106398 A1* 5/2012 Bertin .................. H04W 92/00 370/255

(Continued)

FOREIGN PATENT DOCUMENTS

CN 101437294 A 5/2009
CN 101547517 A 9/2009

(Continued)

OTHER PUBLICATIONS

Author Unknown, Paging and location tracking in RRC_INACTIVE, Doc No. R2-167708, pp. 1-4 (Year: 2016).*

(Continued)

*Primary Examiner* — Christopher M Crutchfield
(74) *Attorney, Agent, or Firm* — Sage Patent Group

(57) ABSTRACT

Disclosed is a method performed by a network equipment for controlling handover of a User Equipment (UE) from a source network node to a target network node. The method comprises providing, for the UE and for the target network node, information comprising a representation of a UE-specific sequence, where the UE-specific sequence is to be incorporated in a signal, the signal to be transmitted by the target network node to enable the UE to initiate a radio link establishment procedure with the target network node based on a reception of a signal comprising said UE-specific sequence.

18 Claims, 14 Drawing Sheets

(51) Int. Cl.
*H04W 36/00* (2009.01)
*H04W 36/38* (2009.01)

(52) U.S. Cl.
CPC ... *H04W 36/0055* (2013.01); *H04W 36/0069* (2018.08); *H04W 36/38* (2013.01)

(56) References Cited

U.S. PATENT DOCUMENTS

| | | | | |
|---|---|---|---|---|
| 2012/0213151 | A1* | 8/2012 | Zhao | H04W 74/006 370/328 |
| 2014/0004863 | A1 | 1/2014 | Zhang et al. | |
| 2014/0098671 | A1 | 4/2014 | Raleigh et al. | |
| 2015/0043472 | A1 | 2/2015 | Seo et al. | |
| 2015/0049649 | A1 | 2/2015 | Zhu et al. | |
| 2016/0057800 | A1 | 2/2016 | Ingale et al. | |
| 2016/0295398 | A1* | 10/2016 | Ketheesan | H04W 8/02 |
| 2016/0374082 | A1 | 12/2016 | Nguyen et al. | |
| 2017/0215117 | A1 | 7/2017 | Kwon et al. | |
| 2017/0295523 | A1* | 10/2017 | Cho | H04W 36/00837 |
| 2019/0104457 | A1* | 4/2019 | Lindoff | H04W 88/08 |

FOREIGN PATENT DOCUMENTS

| | | | |
|---|---|---|---|
| KR | 20160120250 | A | 10/2016 |
| WO | 2016198123 | A1 | 12/2016 |
| WO | 2018/106161 | A1 | 6/2018 |

OTHER PUBLICATIONS

Author Unknown, UL data transmission without RRC signalling without initiating transition to active (option A), pp. 1-25, Nov. 18, 2016 (Year: 2016).*

Author Unknown, Considerations on NR IDLE and RRC_INACTIVE, Doc. No. R2-167709, Nov. 18, 2016, pp. 1-6 (Year: 2016).*

Author Unknown, Downlink data transmission and reception in NR new state, Doc. No. R2-168090, Nov. 18, 2016, pp. 1-5 (Year: 2016).*

Extended European Search Report issued in corresponding EP Application No. 17893129.1 dated Aug. 12, 2020, 09 Pages.

ZTE Corporation ZTE Microelectronics, "Random access in NR", 3GPP Draft; R2-167831 Random Access in NR, 3rd Generation Partnership Project (3GPP), Mobile Competence Centre; vol. RAN WG2, No. Reno, USA; Nov. 13, 2016, XP051177594.

First Chinese Office Action for Chinese Patent Application No. CN 201780088272.3 dated May 27, 2021, 10 pages (including English translation).

* cited by examiner

METHODS AND DEVICES FOR HANDOVER IN A WIRELESS COMMUNICATION NETWORK

CROSS-REFERENCE TO RELATED APPLICATION

The present application is a continuation of U.S. patent application Ser. No. 15/524,293, filed on May 4, 2017, which is a National Stage Entry of PCT International Application No. PCT/SE2017/050060, filed on Jan. 23, 2017, the disclosure and content of each of which are incorporated herein by reference in their entireties.

TECHNICAL FIELD

The proposed technology generally relates to methods and devices for controlling handover in a wireless communication network. More specifically it relates to a method and a corresponding network equipment and apparatus for controlling handover of a User Equipment from a source network node to a target network node. It also relates to methods, and corresponding devices and apparatuses, for operating a target network node during a handover. Corresponding computer programs and computer program products are also disclosed.

BACKGROUND

Handover is a vital part of any mobile communication system. A handover is the process of transferring an ongoing connection of a UE from one cell, referred to as the serving cell, to another cell referred to as the target cell in order to accomplish a transparent service over a larger area. The handover should happen without any loss of data and with as small interrupt as possible.

In LTE only the source network node can make a decision about which cell is the target cell based on UE measurement results, and then the UE will be informed the about the target cell to connect to after it receive the HO command from source network node/cell.

In New Radio, NR, i.e., in radio using beam transmissions the HO procedure is different from LTE in some aspects. HO may now be performed also between beams, and not only between cells. The reference signal for UE to measure on may be a dynamically allocated reference signal, and not the static cell-specific reference signal, CRS. The reference signal is not always on, instead it may be controlled by lean design principles and may only
be transmitted when needed. However, similar to LTE handover procedure, a source network node can still only determine which beam/node is the target network node after receiving UE measurement report, and the UE can only know which beam/node connect to after receiving HO command from source network node.

The problem with the solutions in LTE is that if the UE does not receive the HO command, the UE cannot know which target cell, or target network node, to connect to and the HO procedure will therefore fail.

It should in particular be noted that in New Radio, NR, due to the usage of high gain beamforming, it is possible that the serving radio link quality may deteriorate very fast, especially in higher bands. Therefore, the probability that UE does not receive HO command from source, and thus cannot complete the HO, cannot be ignored.

The proposed technology aims to provide mechanisms that counters some of the problems related to handover in a cellular wireless network. It is a particular aim to provide mechanisms that enables a robust handover even in the case of a bad link quality on the radio link between a network node serving the UE and the UE itself.

SUMMARY

It is an object of the proposed technology to provide mechanisms that counters some of the problems related to handover. It is a particular object to provide mechanisms that enables a robust handover procedure even for the cases where the source network node may have problems reaching a UE with a handover command informing the UE to begin establishing a radio link with a new access network node.

It is a further object to provide methods and devices for controlling a handover procedure whereby a User Equipment will be able to establish a radio link with a new access network node.

Still another object is to provide methods for operating a User Equipment and a corresponding User Equipment.

Yet another object is to provide a method for controlling a network node during handover of a User Equipment from a source network node to the network node.

Another object is to provide computer programs and apparatuses that enables a User Equipment to establish a radio link with a new access network node during handover from a source network node.

These and other objects are met by embodiments of the proposed technology.

According to a first aspect, there is provided a method performed by a network equipment for controlling handover of a User Equipment from a source network node to a target network node. The method comprises providing, for the UE and for the target network node, information comprising a representation of a UE specific sequence, wherein the UE specific sequence is to be incorporated in a signal, the signal to be transmitted by the target network node to enable the UE to initiate a radio link establishment procedure with the target network node based on a reception of a signal comprising the UE specific sequence.

According to a second aspect there is provided a method for operating a network node in a wireless communication network during a handover of a User Equipment, UE, from a source network node to the network node. The method comprises obtaining, from a network equipment, information comprising a representation of a UE specific sequence. The method also comprises transmitting a signal comprising the UE specific sequence to enable the UE to identify the signal based on the UE specific sequence and establish a radio link with the network node based on the identified signal.

According to a third aspect there is provided a network equipment configured to control handover of a User Equipment, UE, from a source network node to a target network node. The network equipment is configured to provide, for the UE and for the target network node, information comprising a representation of a UE specific sequence, wherein the UE specific sequence is to be incorporated in a signal, the signal to be transmitted by the target network node **3*a* to enable the UE to initiate a radio link establishment procedure with the target network node 3*a*** based on a reception of a signal comprising the UE specific sequence.

According to a fourth aspect there is provided a network node configured to operate during a handover of a User Equipment from a source network node to the network node. The network node is configured to obtain, from a network equipment, information comprising a representation of a UE specific sequence. The network node is also configured to transmit a signal comprising the UE specific sequence to enable the UE to identify the signal based on the UE specific sequence and establish a radio link with the network node based on the identified signal.

According to a fifth aspect there is provided apparatus for controlling handover of a User Equipment, UE, from a source network node to a target network node. The apparatus comprises:

a processing module for generating information comprising a representation of a UE specific sequence, the UE specific sequence to be incorporated in a signal transmitted by a target network node to enable a UE to initiate a radio link establishment procedure with the target network node based on a reception of a signal comprising the UE specific sequence; and an output module for outputting the information comprising the representation of a UE specific sequence to enable the information to be provided to a UE and a target network node.

According to a sixth aspect there is provided an apparatus for enabling a radio link establishment between a User Equipment and a network node during handover of the User Equipment from a source network node and the network node. The apparatus comprises:

a reading module for reading information comprising a representation of a UE specific sequence; and an output module for outputting the content of a signal comprising the UE specific sequence, the signal to be transmitted to enable a UE to identify the signal based on the UE specific sequence and establish a radio link with the network node 3*a* based on the identified signal.

According to a seventh aspect there is provided a computer program that comprises instructions, which when executed by at least one processor, cause the at least one processor to:

generate information comprising a representation of a UE specific sequence, the UE specific sequence to be incorporated in a signal transmitted by a target network node to enable a UE to initiate a radio link establishment procedure with the target network node 3*a* based on a reception of a signal comprising the UE specific sequence; and output the information comprising the representation of a UE specific sequence to enable the information to be provided to a UE and to a target network node.

According to an eighth aspect there is provided a computer program that comprises instructions, which when executed by at least one processor, cause the at least one processor to:

read information comprising a representation of a UE specific sequence; and output the content of a signal comprising the UE specific sequence to enable a UE to identify the signal based on the UE specific sequence and establish a radio link with the network node based on the identified signal.

According to a ninth aspect there is provided a carrier comprising any of the computer programs according to the aspects above, wherein the carrier is one of an electronic signal, an optical signal, an electromagnetic signal, a magnetic signal, an electric signal, a radio signal, a microwave signal, or a computer-readable storage medium.

The proposed technology enables a robust and timely handover even for those cases where the radio link between a UE and a serving network node is quickly deteriorating. The handover procedure can be made more robust since, even if the UE does not receive a specific handover command via the link between the UE and the source network node, it will still be able to connect to a target network node. The handover procedure provides an alternative handover procedure where the connection between a target network node and a UE does not depend on a traditional handover command. Furthermore, the UE does not need to know which target network node the handover command may come from and the UE does not need to have a previously established a link to the target network node.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figure 1:
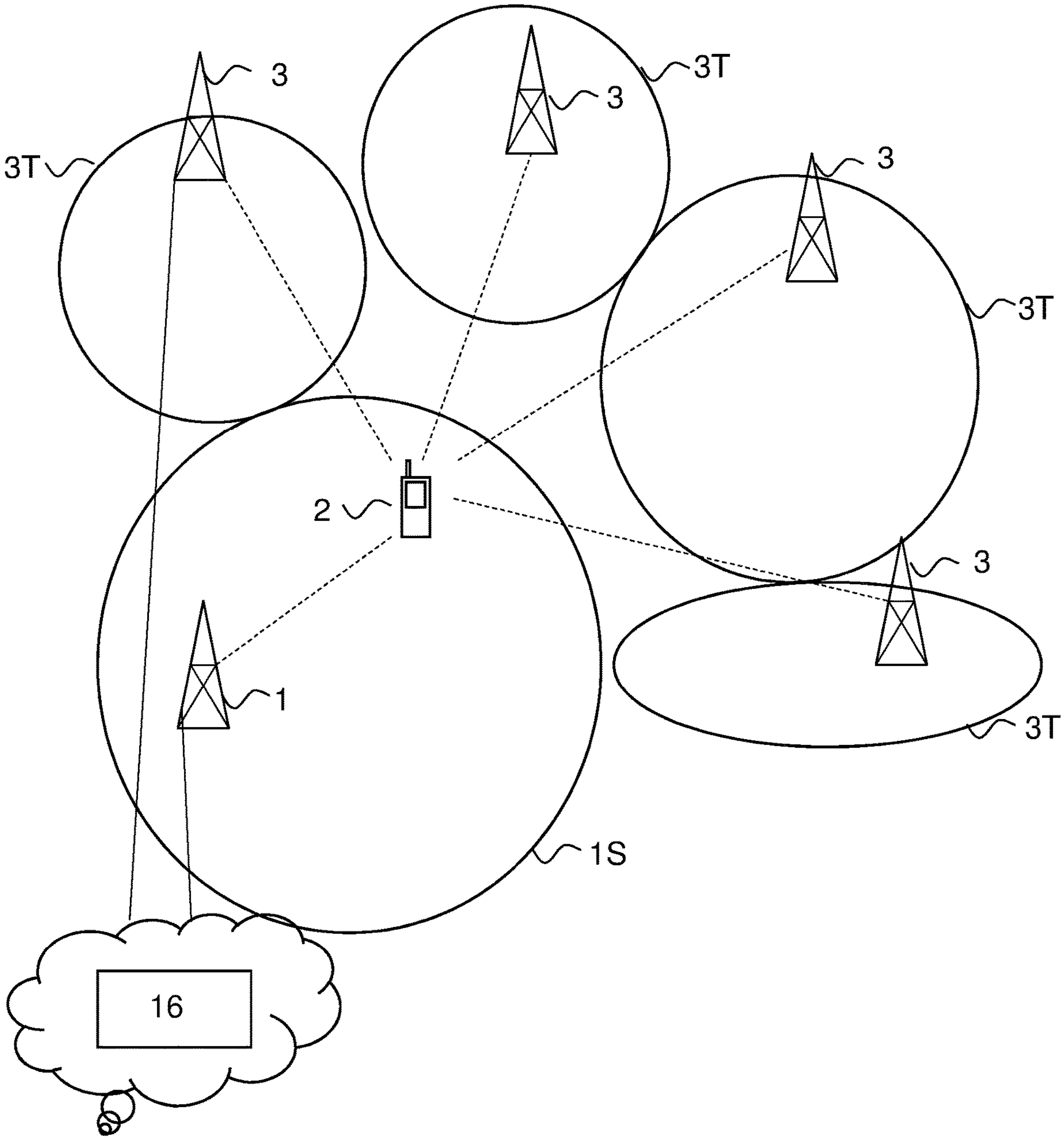
FIG. 1 is a schematic illustration of a cellular communication network comprising a source network node, a User Equipment and a number of candidate target network nodes.

For a better understanding of the proposed technology, it may be useful to begin with a brief system overview and an analysis of the technical problem. To this end reference is made to FIG. 1 which provides a schematic illustration of a cellular wireless communication network comprising a source network node 1, which may be referred to as a source access network, serving a UE 2 within a cell 1S, and several neighbouring access network nodes 3. The neighbouring network nodes, or neighbouring access network nodes, 3 may during a handover scenario be seen as target access network nodes or, more briefly target network nodes, or even target nodes, since they are all potential target network nodes during a handover off a User Equipment from a source network node to a new network node, i.e. the target network node. The potential target network nodes 3 provides service to e.g. UEs within a particular cell. The different neighbouring cells are collectively denoted 3T in FIG. 1. It should be noted that a single cell may be served by several access nodes. Also displayed in FIG. 1 is a schematic illustration of a network equipment 16 implemented as a virtualized component in the network, i.e. as a cloud based equipment. In certain embodiments of the proposed technology such a network equipment will be used for controlling a handover procedure whereby a UE 2 will be handover from the source network node 1 to a particular target network node 3. The cloud implementation of the network equipment will be described in detail in a later section of the disclosure.

The dashed lines in FIG. 1 provides a schematic illustration of potential radio links between the UE 2 and the various access nodes 1; 3. The solid lines provides a schematic illustration of inter-node links that enables the access nodes 1; 3 and the network equipment 16 to communicate with each other. The UE 2 may also communicate with the cloud based network equipment 16 through, e.g. an intermittent access node, such as the serving network node 1. It should be noted that the dashed lines may symbolize either regular transmissions, e.g. using non-beam forming antennas, or beam formed transmissions as will be common in 5G networks. The use of advanced antennas as in 5G is often referred to as New Radio, NR.

A particular problem associated with cellular networks as the one depicted in FIG. 1 is that the radio link quality between a UE 2 and a serving network node 1, e.g. a serving access network node, may deteriorate as the UE approaches the boundaries of the cell served by the source network node and may as a consequence experience deteriorating signal strength on the downlink. This will negatively affect the UEs ability to receive signals from the serving node. The UE may also experience problems to transmit signals on the uplink that can be received and decoded by the source network node. To counter these problems the serving network node, i.e. the source network node, may order a handover, HO, whereby the service to the UE is transferred to another access node, i.e. to a target network node. The target network node replaces the source network node as the node serving the UE. To be able to provide as smooth a transition as possible between the different access nodes, i.e. between the source network node and target network node, a timely handover should be initiated. To enable a timely transition continuous measurements of the quality on the up- or downlinks connecting the source network node and the UE are performed. When the quality on, e.g., the uplink falls below some specified criterion, e.g. below some threshold, a handover procedure may be triggered whereby a suitable target network node should be selected to act as the new serving access node for the UE. Normally the UE is provided with information about the handover through a handover command, HO command indicating that the UE is subject to a handover and should aim to establish access to a new access node, normally selected from a set of candidate access network nodes that can be obtained from a neighbour list.

A handover as described above may also be required in the case of beam formed transmissions as in 5G. Beam formed transmissions refer to transmissions wherein the majority of the signal energy is directed in a particular direction. As a consequence a beam formed transmission, e.g. between the serving network node 1 and the UE 2, may be blocked by obstacles on the path connecting the serving network node 1 and the UE 2. This will negatively affect the UEs ability to detect and decode a transmitted signal. To counter this a handover may be required. The handover may in this particular case refer to a beam switch where a new beam is selected for communication with the UE. More generally the handover may refer to both a beam switch within the serving access node and a change of serving access node.

Common to both scenarios above is that the actual handover is communicated by the serving access node, i.e. the source network node, through a handover command whereby the UE is acknowledged about an upcoming handover. In the case that the radio link between the serving access node and the UE has deteriorated severely the UE may have trouble to detect even the handover command. The serving access node may therefore try to transmit a handover command multiple times. This may lead to a lot of unnecessary signalling between the UE and the serving access node and there is no guarantee that the handover command will reach the UE.

The proposed technology aims to provide mechanisms that counters some of the drawbacks associated with handover commands transmitted from the serving access nodes. It aims in particular to provide a procedure whereby cooperating entities in the cellular network provides for a robust handover that enables the UE to establish a radio link with a new access network node, i.e. a target network node, in a timely fashion. This will amongst other positive features ensure a reduced signalling between the serving access node and the UE.

Figure 2:
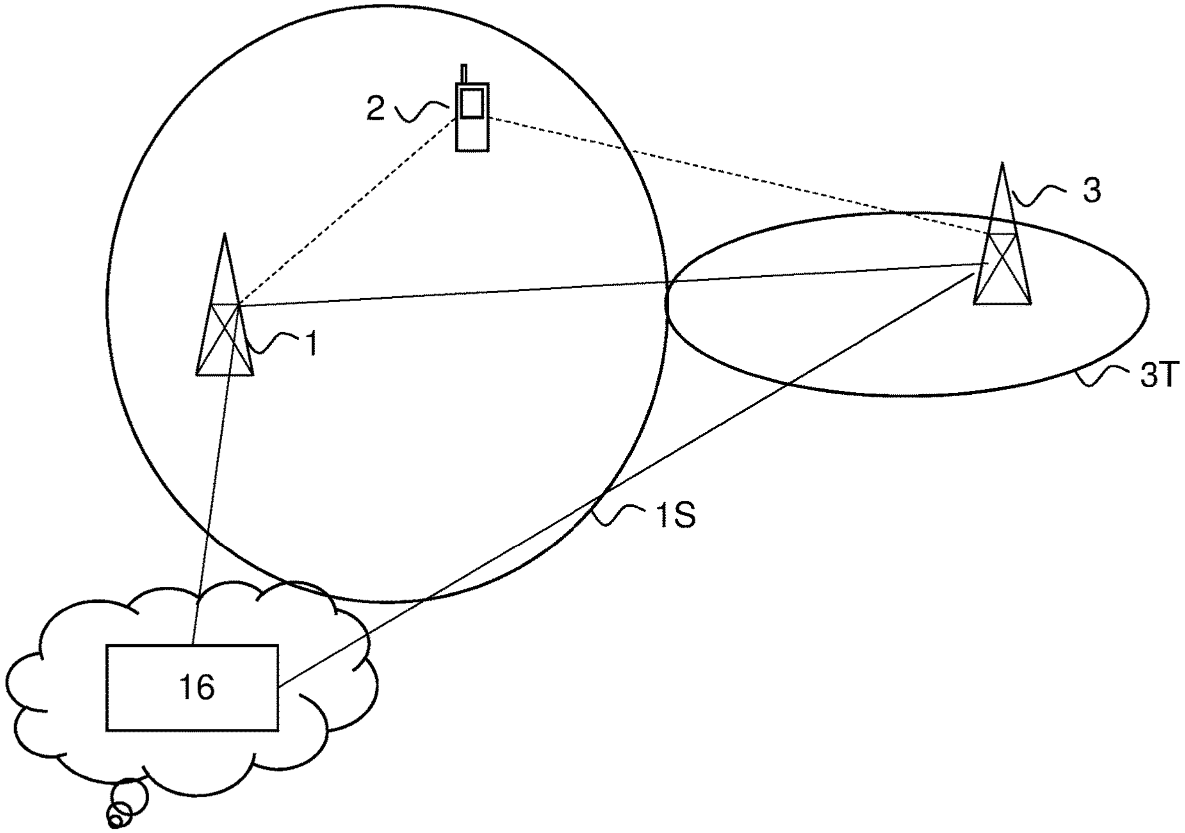
FIG. 2 is a simplified illustration of a cellular communication network comprising a source network node, a User Equipment and a single candidate target network node.

To briefly describe the proposed mechanism reference is made to FIG. 2. FIG. 2 is a simplified version of the cellular network illustrated in FIG. 1. Shown is a source network node 1 serving a UE 2 within a cell 1S, schematically illustrated by a circle. Also shown is a candidate access network node, e.g. a potential target network node 3*a*, serving a possible adjacent cell 3T, and a network equipment 16 implemented in the cloud. The proposed technology relates to a cooperating procedure between the entities that will enable a swift and secure handover of the UE 2 from the source network node 1 to the target network node 3*a*.

To this end consider first the network equipment 16. According to the proposed technology the network equipment 16 performs, i.e. is configured to perform, a method for controlling handover of a User Equipment, UE, 2 from a source network node 1 to a target network node 3*a*. The method comprises providing, for the UE 2 and for the target network node 3*a*, information comprising a representation of a UE specific sequence. The UE specific sequence provided to the UE and the target network node is to be incorporated in a signal. The signal is in turn intended to be transmitted by the target network node 3*a* to enable the UE 2 to initiate a radio link establishment procedure with the target network node 3*a* based on a reception of a signal that comprises the UE specific sequence. That is, the network equipment 16 provides information to both the UE 2 and the target network node that will enable them to communicate with each other, in order to establish a subsequent radio link, in the case that the source network node is not able to communicate with the UE, e.g. due to blocking of a beam formed transmission intended for the UE. The information comprising a representation of a UE specific sequence that is provided to the UE 2 and the target network node may be provided well in advance of a possible handover. The UE 2 may for example be provided with the information when it enters the cell 1S of the initially serving source network node 1 while the target network node 3*a* may be provided with the information at a later stage, e.g. at a time when the handover is imminent. Other possibilities exists however and a number of examples will be provided when the proposed method is described in larger detail below. Note that the network equipment in certain embodiments may be the source network node 1. Note also that the information provided by the network equipment 16 in certain examples may be conveyed to the UE 2 through the intermittent source network node 1.

Consider now the cooperating features of the target network node 3*a*. The target network node 3*a* is configured to obtain information comprising a representation of a UE specific sequence from the network equipment 16. Having obtained the information, the target network node will transmit a signal that comprises the UE specific sequence. The UE specific sequence comprised in the signal will be used by the UE 2 to identify the signal, and when that happens the UE 2 will proceed and aim to establish a radio link with the target network node 3*a*.

Consider finally the cooperation of the UE 2. The UE 2 is configured to perform a method wherein the UE 2 obtains, from the network equipment 16, information comprising a representation of a UE specific sequence. Having obtained this information the UE can identify, using the UE specific sequence, a signal transmitted from a target network node 3*a*, and based on the identified signal transmit a message for establishing a radio link with the target network node 3*a*. Hence the UE 2 will utilize the information comprising the UE specific sequence provided by the network equipment 16 in order to identify a particular signal transmitted from the target network node 3*a*. The identification of such a signal will trigger the UE 2 to transmit a message that aims to establish a radio link with the target network node 3*a*. The identified signal may therefore be seen as handover command that triggers the UE 2 to try to establish a radio link with its new access network node, i.e. the target network node.

Figure 3:
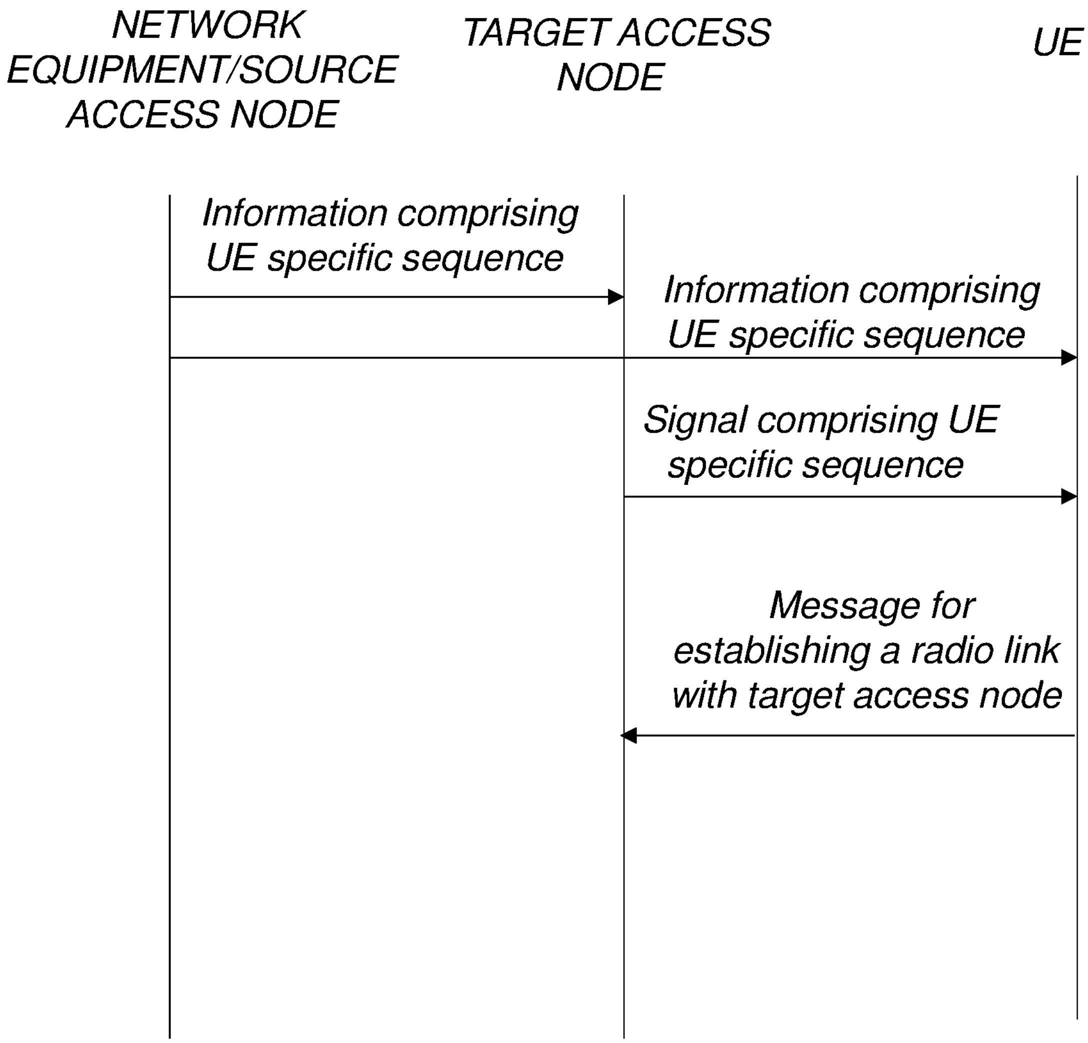
FIG. 3 is a signaling diagram illustrating the signaling between the cooperating devices according to a particular example of the proposed technology.

A schematic signal diagram illustrating the procedure is provided by FIG. 3. Here the network equipment 16, or the source network node 1, provides the information to the UE 2 and the target network node 3*a*, albeit at possibly different times. When the target network node 3*a* has been provided with the information it transmit the signal that comprises the UE specific sequence. The UE will use the initially provided UE specific sequence to identify the signal transmitted from the target network node 3*a*, the UE 2 will interpret the received signal as a particular handover command and will initiated an access procedure with the target network node 3*a* by transmitting a message for establishing a radio link.

A particular benefit with the proposed technology is that it overcomes the need that the source network node 1 has to transmit a handover command to the UE 2. The proposed technology will instead enable an alternative way of providing the UE 2 with a handover command, i.e. by letting the UE 2 interpret a received signal that comprises a particular UE specific sequence as a handover command. Since the received signal is transmitted from the particular target network node to which the UE should connect during the handover, it will in certain embodiments also be possible for the target network node to provide further information in the transmitted message, e.g. information specifying particular details relating to the establishment procedure to be performed.

Having described the overarching mechanisms proposed by the present technology, in what follows the various methods will be described in greater detail.

Figure 4:
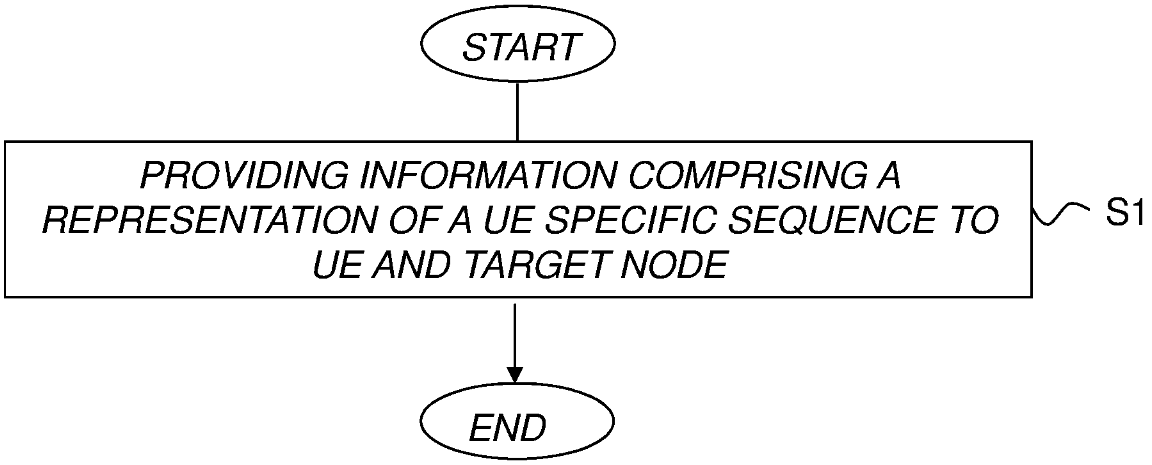
FIG. 4 is a flow diagram illustrating a method performed by a network equipment for controlling the handover of a User Equipment from a source network node to a target network node according to the proposed technology.

FIG. 4 is a schematic flow diagram illustrating an example of a method according to the proposed technology. Illustrated is a method performed by a network equipment 16 for controlling handover of a User Equipment, UE, 2 from a source network node 1 to a target network node 3*a*. The method comprises providing S1, for the UE 2 and for the target network node 3*a*, information comprising a representation of a UE specific sequence, wherein the UE specific sequence is to be incorporated in a signal, the signal to be transmitted by the target network node 3*a* to enable the UE to initiate a radio link establishment procedure with the target network node 3*a* based on a reception of a signal comprising the UE specific sequence.

In other words, the network equipment 16 provides both the UE 2 and a target network node 3*a* with information that comprises a representation of a UE specific sequence. The information may be provided to the UE 2 over the air-interface, i.e. it may have been communicated from the network equipment 16 to the source network node 1, e.g. over an interface allowing a communication between the source network node and the network equipment, and then relayed from the source network node 1 to the UE 2 via a signal transmitted over the air-interface. The network equipment may also utilize this particular procedure to provide the target network node with the information. It may however also provide the information over an interface that allows a direct communication between the network equipment 16 and the target network node. The representation may in particular embodiments comprise a binary sequence, or a sequence of digits, or some other sequence that can be used to identify the particular UE 2. The provided representation of a UE specific sequence is not necessarily what is later transmitted from the target network node 3*a*, depending on the particular form of the representation the target network node 3*a* may instead utilize a mapping whereby the provided representation is transformed into a sequence that may be easier to incorporate into a signal. This mapping should also be available to the UE. The important feature is that the provided sequence is specific to a particular UE and that it can be interpreted correctly. It should be noted that the information that is provided by the network equipment may comprise more than the UE specific sequence. In certain embodiments the provided information may comprise the complete information to be transmitted by the target network node 3*a*. That is, the network equipment may provide the complete information content of the signal to be transmitted from the target network node. In other embodiments the network equipment may provide the UE specific sequence together with configuration information on how to generate the signal to be transmitted and how to decode a received signal. It may in particular provide information on the particular signal to be used, e.g. a reference signal, or the particular section or field of the signal that shall contain the UE specific signal to ensure that the UE quickly may decode the relevant section of a received signal and compare it with the obtained UE specific sequence. The provided information may also comprise instructions for the target network node 3*a* and the UE on how to establish a radio link. To this end the information may also contain time or time and frequency resources that can be used for establishing a radio link. Consider for example the scenario where the network equipment 16 provides the UE 2 and the target network node 3*a* with the UE specific sequence and particular time and/or time and frequency resources. The target network node may thus generate a signal that comprises the UE specific sequence and transmit the signal. If the UE 2 is able to detect and decode the relevant parts of signal, i.e. to ensure that signal comprises the UE specific sequence, the UE may transmit a message for establishing a radio link with the target network node based on the provided time and/or time and frequency resources. Since the target network node has been provided with the corresponding information it may swiftly receive the message and proceed with the radio link establishment procedure. Other possibilities are however possible and will be described in a later section of the disclosure.

It is thus clear that the information provided by the network equipment may comprise more than just the UE specific sequence. The network equipment may in certain embodiments also provide a parameter that can be used by the UE 2 during the establishment procedure. The parameter could for example be the time and/or time and frequency resources described above but it may also be related to the identity of the target network node 3*a* or the cell identity of the cell served by the target network node 3*a*. The identity may be used by UE for transmitting a radio link establishment message towards the target network node 3*a*.

According to a particular embodiment of the proposed technology there is provided a method wherein the information comprising UE specific sequence is provided to at least the UE 2 when the UE 2 establishes a connection with the source network node 1. That is, when the UE connects to the source network node 1 it will be provided with the UE specific sequence and possibly other information, as described above. The network equipment 16 does not have to provide the target network node with the information at this point in time since a potential handover may be far into the future. It is however also possible to provide the UE 2 as well as all, or at least a subset of, the potential target network nodes with the information directly when the UE establish a connection, or enters a cell served by, the source network node 1.

In order to describe another particular embodiment of the proposed technology reference is made to FIG. 1. FIG. 1 provides a schematic illustration of a cellular wireless communication network comprising a source network node 1 serving a UE 2 within a cell 1S, and several neighbouring access network nodes 3. The set of neighbouring access network nodes 3 may be seen as candidate target network nodes, or candidate target access network nodes, insofar that they all might be considered the most suitable target network node during a handover of the UE from the source network node. The network equipment 16 may thus provide a particular target network node 3*a* with the information comprising the UE specific sequence based on measurements of the quality of the links between the UE 2 and at least two candidate network nodes 3*a*; 3*b*. A particular procedure may be that the network equipment 16, or the source network node 1, obtains measurement reports from a UE 2. The measurement reports relates to the quality of the radio link between the UE 2 and several, i.e. two or more, candidate target network nodes 3*a*; 3*b*. The network equipment 16 may thus provide the most suitable target network node with the information comprising the UE specific sequence. The network equipment 16 may provide the UE 2 with the corresponding information at either an earlier time or at the same time. The measurement reports may be based on either uplink measurements, i.e. measurements performed by the candidate access network nodes on signals transmitted from the UE or downlink measurements, i.e. measurements performed by the UE 2 on downlink signals. The UE 2 may in particular perform periodic measurements on e.g. downlink signals or reference signals transmitted from various candidate access nodes and report the outcome of the measurements to e.g. the source network node 1. The source network node 1 may convey the measurement reports to the network equipment so that the network equipment may provide the information comprising the UE specific sequence to the most suitable target network node 3*a* based on the content of the measurement reports. The information is, according to a particular embodiment, provided to at least the target network node 3*a* based on the outcome of measurements of the quality of the links between the UE 2 and at least two candidate network nodes 3*a*; 3*b*, whereby the UE specific sequence is provided if the quality fulfills a specified criterion. The UE 2 may also be provided with the corresponding information at the same time.

According to another embodiment of the proposed technology the network equipment 16, or the source network node 1, if the method is performed by the source network node, may instead obtain measurement reports from a set of candidate access network nodes 3*a*;3*b*. The measurement reports relates to the quality of the uplink between the UE 2 and several, i.e. two or more, candidate target network nodes 3*a*; 3*b*. The network equipment 16 may thus provide the most suitable target network node with the information comprising the UE specific sequence based on the obtained measurement reports. The network equipment 16 may provide the UE 2 with the corresponding information at either an earlier time or at the same time. According to this particular embodiment the UE 2 may transmit a signal towards all of the candidate access network nodes 3*b*, i.e. towards all potential target network nodes. The candidate access network nodes may perform measurements on the transmitted signal and report the result to the network equipment 16. The network equipment may then determine a suitable target network node 3*a*, from the set of candidate access network nodes, based on the measurement reports.

According to yet another embodiment of the proposed technology there is provided a method wherein the measurements relates to the quality on the radio link between the UE 2 and each of at least a subset of the candidate target network nodes. That is, the UE 2 provides measurement reports for a number of candidate target network nodes 3*b* and the network equipment 16 in return provides the information comprising the UE specific sequence based on the outcome of the measurements. The network equipment 16 may for example provide only the most suitable target network node with the information while ignoring the remaining candidates.

An alternative is however provided by a method wherein the step of providing information comprising a UE specific sequence to a target network node 3*a* also comprises to provide the information to a plurality of candidate target network nodes 3*a*; 3*b*. That is, the network equipment may provide at least a subset of all candidate target network nodes with the information.

According to yet another embodiment of the proposed technology there is provided a method that further comprises selecting, based on the outcome of measurements of the quality on the links between the UE 2 and at least two candidate network nodes 3*a*, 3*b*, the particular network node 3*a* that will act as a target network node and informing the network node 3*a* that it has been selected as the target network node 3*a*.

An optional version of the mentioned embodiment provides a method that further comprises the step of informing the candidate network nodes that were not selected to act as target network node 3*a* for the UE 2 to not transmit a signal comprising the UE specific sequence. In this way unnecessary signaling, possibly leading to interference effect, may be reduced. This will also ensure that the UE does not have to receive and decode an unnecessary large number of signals comprising the UE specific sequence.

According to a particular embodiment of the proposed technology there is provided a method wherein the step S1 of providing information comprising a representation of a UE specific sequence further comprises to provide a parameter to be incorporated in the signal, the parameter enabling the UE 2 to establish a radio link with the target network node 3*a*.

According to a particular embodiment there is provided a wherein the parameter comprises a transmission time resource or a transmission time and frequency resource to be used by the UE 2 for transmitting a message to the target network node 3*a* to establish a radio link with the target network node 3*a*.

According to a particular embodiment of the proposed technology there is provided a method wherein the handover comprises a beam switch.

The proposed method has been described as performed by a cloud implemented network equipment 16, it should however be noted that the proposed method may also be performed by the source network node 1.

Having described the method performed by the network equipment 16, or the source network node 1, below will follow a more detailed description of a method for operating a target network node during handover. To this end reference is made to FIG. 5.

Figure 6:
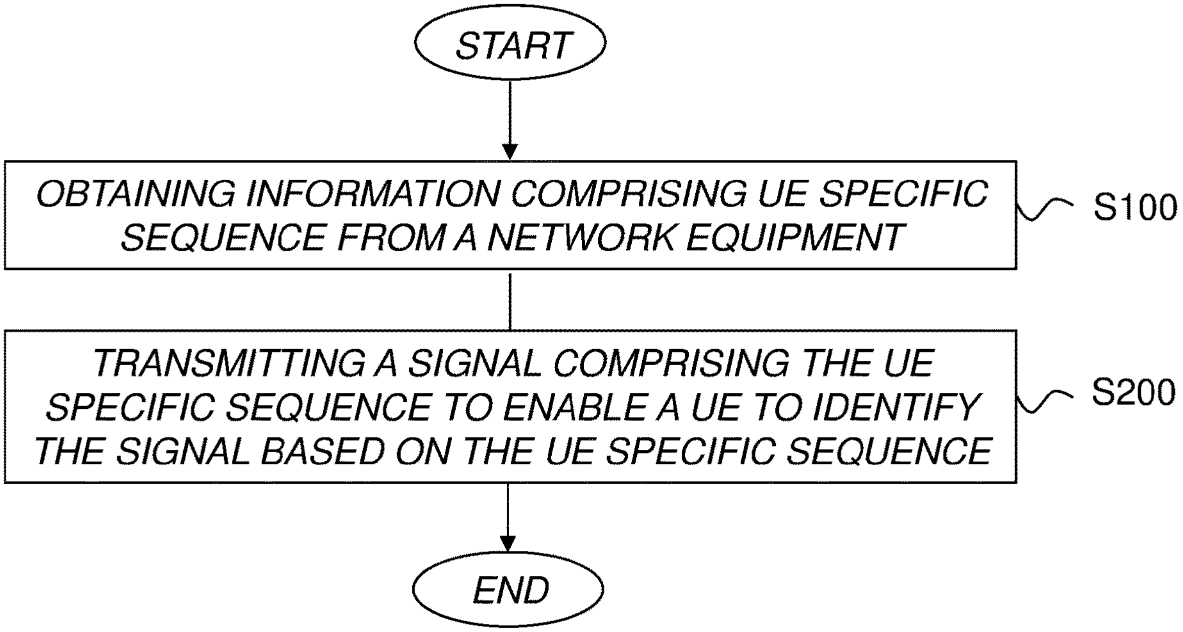
FIG. 6 is a is a flow diagram illustrating a method for operating a network node, i.e. a target network node, during handover of a User Equipment from a source network node to the network node according to the proposed technology.

FIG. 6 provides a flow diagram illustrating a method according to the proposed technology. Illustrated is a method for operating a network node 3*a* in a wireless communication network during a handover of a User Equipment 2 from a source network node 1 to the network node 3*a*. The method comprises obtaining S100, from a network equipment 16, information comprising a representation of a UE specific sequence. The method also comprises transmitting S200 a signal comprising the UE specific sequence to enable the UE 2 to identify the signal based on the UE specific sequence and establish a radio link with the network node 3*a* based on the identified signal.

In other words, the method performed by the network node 3*a* utilizes information obtained from a network equipment 16 to generate a signal that comprises at least the UE specific sequence. The information may be obtained directly from the network equipment 16, over an interface that allows communication between the network equipment and the target network node 3*a*. The information may alternatively be obtained by receiving it over the air-interface, e.g. as received from the source network node. It may in another example be obtained from the source network node 1 through an inter-node interface that allow access network nodes to communicate with each other, e.g. through wired or wireless communication. The UE specific sequence was provided by the network equipment in a particular representation, it is optional whether this representation or some processed version of it is incorporated in the signal. The representation of the UE specific sequence may thus not be what is transmitted from the network node 3*a*. The network node 3*a* may instead utilize a mapping whereby the provided representation is transformed into a sequence that may be easier to incorporate into a signal. The important feature is that the provided sequence, transformed or not transformed, is specific for a particular UE and that the UE is able to identify the sequence. The method also comprises to transmit the generated signal in order for the UE 2 to identify the signal, using the particular transmitted version of the representation of the UE specific sequence. Having identified the signal the UE 2 may initiate an establishment procedure by transmitting a message for establishing a radio link with the network node 3*a*. It should be noted that the information that is provided by the network equipment 16 may comprise more than the UE specific sequence. In certain embodiments it may comprise instructions specifying what type of signal to be used, e.g. a reference signal. In other embodiments it may comprise instructions on particular resources to be used by the network node 3*a* when transmitting the signal. In certain embodiments the provided information may comprise resources to use as well as the complete signal content to be transmitted by the network node 3*a*. Other embodiments provide for the possibility that the information merely contains a representation of the UE specific sequence, in such embodiments the network node 3*a* may supplement the signal content by providing, e.g. the network node identity or the cell identity of the cell served by the network node 3*a*. The network node 3*a* may for example transmit a signal that includes the UE specific sequence and information on how the UE may transmit the message for establishing a radio link with the network node. This information may contains parameters that enables the UE 2 to establish a radio link with the network node also contain time and/or time and frequency resources that can be used for establishing a radio link with the network node. Other examples of the information content that may be incorporated in the signal beside the UE specific sequence was described in relation to the method performed by the network equipment.

It is thus clear that the information included in the signal to be transmitted may comprise more than just the UE specific sequence. The network node 3*a* may, as was mentioned above, in certain embodiments also provide a parameter that can be used by the UE 2 during the establishment procedure. The parameter could for example be time and/or time and frequency resources but it may also be related to the identity of the network node 3*a* or the cell identity of the cell served by the target network node 3*a*. This identity may be used by UE when transmitting a radio link establishment message towards the target network node 3*a*.

An embodiment of the proposed technology provides therefore a method wherein the signal comprising the UE specific sequence further comprises a parameter enabling the UE to establish a connection with the network node 3*a*.

According to a particular embodiment of the proposed technology there is provided a method wherein the parameter is comprised in the information obtained from the network equipment 16.

According to yet another embodiment of the proposed technology there is provided a method wherein the step S200 of transmitting a signal comprises transmitting a signal comprising the UE specific sequence and the parameter, wherein the parameter comprises information enabling the UE 2 to identify the target network node 3*a*. The information may for example be the cell identity of the cell served by the network node 3*a*.

According to still another embodiment of the proposed technology there is provided a method wherein the parameter provides an explicit identification of the target network node 3*a*.

According to yet another embodiment of the proposed technology there is provided a method wherein the parameter comprises a transmission time resource or a transmission time and frequency resource enabling the UE 2 to transmit a message using the resource. In other words, the network node 3*a* may supplement the information content of the signal to be transmitted with a parameter specifying certain resources to be used by the UE 2 when the UE 2 transmits a message for establishing a radio link with the network node 3*a*.

According to a particular embodiment of the proposed technology there is provided a method also comprises receiving, at resources associated with the transmission time or the transmission time and frequency resource provided to the UE 2, a message for establishing a radio link with the target network node 3*a*.

According to a particular embodiment of the proposed technology there is provided a method wherein the transmitted signal comprising the UE specific sequence further comprises Time/Frequency, T/F, synchronization features enabling the UE 2 to establish downlink synchronization with regard to the target network node 3*a*.

According to a specific embodiment of the proposed technology there is provided a method wherein the transmitted signal comprising the UE specific sequence comprises a designated Layer 1 signal, L1-signal, preferably a reference signal.

According to a particular embodiment of the proposed technology there is provided a method wherein the step S100 of obtaining the representation of the UE specific sequence from the network equipment 16 comprises to receive the representation of the UE specific sequence from the source network node 1.

According to a particular embodiment of the proposed technology there is provided a method wherein the handover comprises a beam switch.

Below will follow a detailed description of the proposed method performed by the User Equipment, UE. To this end reference is made to FIG. 6. Certain features of the method has been described earlier in connection to the earlier described methods. What was stated there applies equally well here and will not be repeated. The explanation regarding the provided representation of a UE specific sequence given earlier may for example be directly incorporated into the description below.

Figure 5:
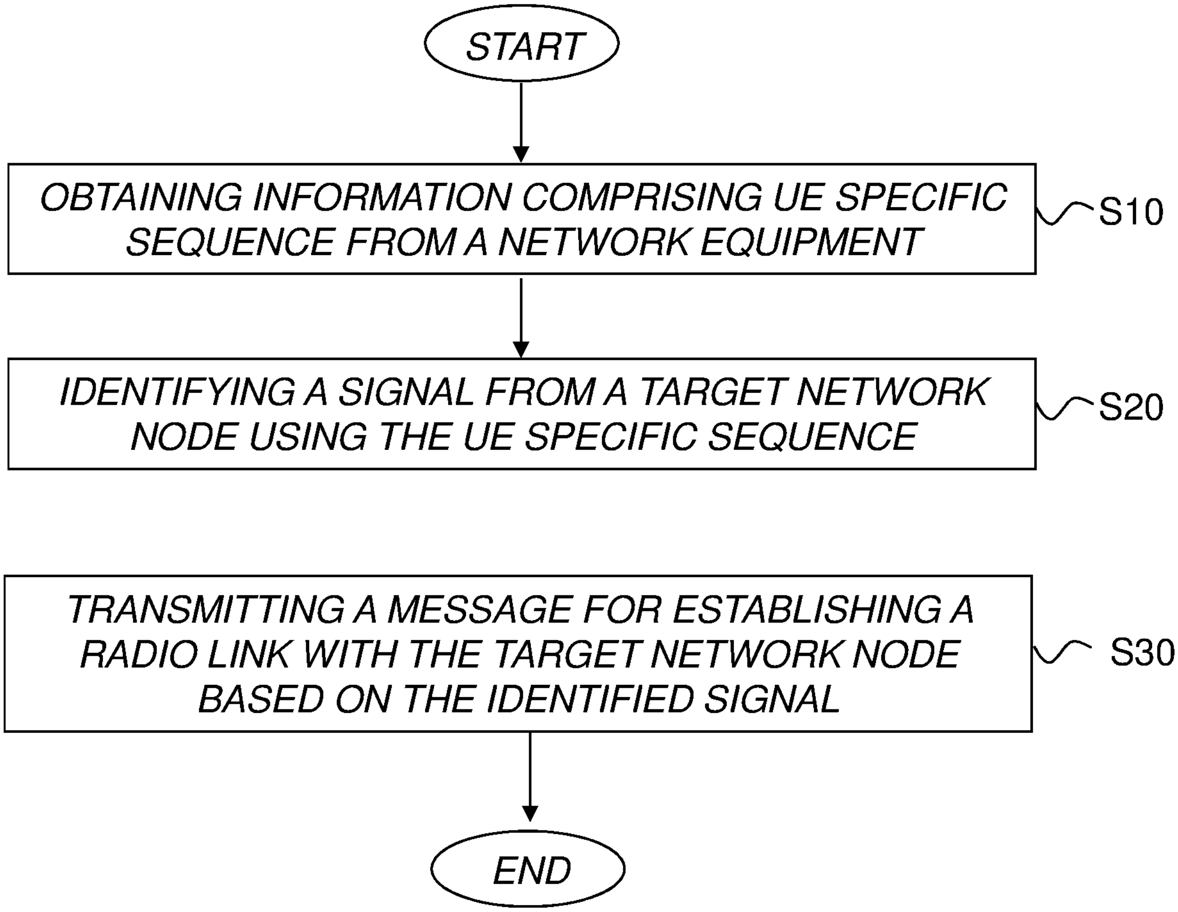
FIG. 5 is a flow diagram illustrating a method for operating a User Equipment according to the proposed technology.

FIG. 5 is a flow diagram illustrating a method according to the proposed technology. Illustrated is a method for operating a User Equipment, UE, 2 in a wireless communication network. The method comprises obtaining S10, from a network equipment 16, information comprising a representation of a UE specific sequence. The method also comprises identifying S20, using the representation of a UE specific sequence, a signal received from a target network node 3*a*. The method further comprises transmitting S30 a message for establishing a radio link with the target network node 3*a* based on the identified signal.

Stated slightly differently, there is provided a method wherein a UE 2 utilizes information obtained from a network equipment 16 in order to identify a particular signal transmitted from a target network node 3*a*. The information may be obtained in a message from the network equipment, e.g. it may have been communicated from the network equipment to the source node, e.g. over an interface allowing a communication between the source network node and the network equipment, and the relayed from the source network node 1 to the UE 2 via a transmitted signal. The obtained information comprises a particular representation of a UE specific sequence, e.g. a particular binary sequence, or a sequence of digits, or some other sequence. The obtained representation of the UE specific sequence is not necessarily what is later used for identifying a signal. The UE specific sequence may, depending on the particular form of the representation, have been transformed by the target network node 3*a*, for example by using a mapping whereby the provided representation is transformed into a sequence that may be easier to incorporate into a signal. This mapping should also be available to the UE. The important feature is that the provided sequence is specific to a particular UE and that it can be interpreted correctly by the UE when identifying the signal. In a particular example the UE 2 may identify a signal using the UE specific sequence by detecting a signal and processing at least part of the signal, i.e. demodulating and decoding at least part of the signal content, in order to find out whether a detected signal comprises the UE specific sequence. The UE may, in relevant scenarios, also use the particular mapping between the obtained representation of the UE specific sequence and the transmitted sequence to identify the signal. The UE may thus detect, or receive, a signal, demodulate and decode the signal and apply the mapping on a particular signal content in order to determine whether the signal did comprise the UE specific sequence. If the signal do in fact comprise the UE specific signal the UE may interpret the signal as a handover command, even though the command is not transmitted by the source network node serving the UE 2. The UE 2 may then act based on such an identified signal and transmit a message in order to establish a radio link with the target network node 3*a* that transmitted the identified signal. The transmitted message may in certain examples be a signal intended for this particular purpose, but it is also possible that the message corresponds to an already existing signal, such as a Physical Random Access Channel preamble, PRACH-preamble. The described procedure will ensure that the UE 2 is informed about an upcoming handover even in those cases where the source network node 1 has problems reaching the UE 2 with a handover command. As has been explained earlier, the UE 2 may be provided with information beyond the particular UE specific sequence, either from the network equipment 16 together with the UE specific sequence or from the target network node 3*a*, e.g. comprised in the transmitted signal that contains the UE specific sequence. Particular examples of such information, such as e.g. a parameter, and how it may be used has been described earlier and will be described further below using particular embodiments.

According to a particular embodiment of the proposed technology there is provided a method wherein the information comprising a representation of a UE specific sequence further comprises a parameter enabling the UE to establish a connection with the target network node 3*a*. The UE 2 is in this particular embodiment provided with a parameter from the network equipment 16.

According to an alternative embodiment of the proposed technology there is provided a method wherein the identified signal received from the target network node 3*a* comprises a parameter enabling the UE to establish a connection with the target network node 3*a*.

According to still another particular embodiment of the proposed technology there is provided a method wherein the step S30 of transmitting a message for establishing a radio link with the target network node 3*a* comprises transmitting a message based on the parameter.

According to yet another particular embodiment of the proposed technology there is provided a method wherein the parameter provides information enabling the UE 2 to identify the target network node 3*a*. The parameter may in this particular embodiment be the cell identity of the cell served by the target network node 3*a*.

According to still another embodiment of the proposed technology there is provided a method wherein the parameter comprises an explicit identification of the target network node 3*a*.

According to a particular embodiment of the proposed technology there is provided a method wherein the parameter comprises a transmission time resource or a transmission time and frequency resource and wherein the step S30 of transmitting a message for establishing a radio link with the target network node 3*a* comprises transmitting a message using the transmission time resource or the transmission time and frequency resource.

According to another particular embodiment of the proposed technology there is provided a method wherein the received signal further comprises Time/Frequency, T/F, synchronization features enabling the UE 2 to establish downlink synchronization with regard to the target network node 3*a*.

According to yet another embodiment of the proposed technology there is provided a method wherein the received signal from the target network node 3*a* comprises a Layer 1-signal, L1-signal, preferably a reference signal.

According to still another embodiment of the proposed technology there is provided a method wherein the step S30 of transmitting a message to the target network node 3*a* for establishing a radio link with the target network node 3*a* comprises to transmit a Physical Random Access Channel preamble, PRACH-preamble.

According to a particular embodiment of the proposed technology there is provided a method wherein the network equipment 16 comprises the source network node 1 and wherein the step S10 of obtaining the representation of the UE specific sequence comprises to receive the representation of the UE specific sequence in a signal transmitted from the source network node 1.

According to an embodiment of the proposed technology there is provided a method wherein the handover comprises a beam switch.

Having described the various cooperating methods as performed by the network equipment 16, the network node 3*a* and the UE 2, respectively, below there will be provided detailed descriptions of various examples of the proposed technology. These examples are merely intended to facilitate the understanding of the proposed technology and should therefore not be construed as limiting.

A first example relates to a scenario where a User Equipment 2 attaches, or connects to, a source network node 1 and is then subject to a handover from the source network node to a target network node 3*a*. In this particular example, the method for controlling a handover of the UE is performed by the source network node 1, i.e. the earlier described network equipment 16 is comprised in the source network node 1. By way of example, the UE 2 may be provided, by the source network node 1 in step S1, with a representation of a UE specific sequence during the initial connection establishment between the UE 2 and the source network node 1. This is however optional, the UE 2 may instead be provided with the representation of a UE specific sequence at a later stage, e.g. closer to an approaching handover. The provided sequence may for example be a binary sequence that is unique, at least within the cell in which the UE is served, which will enable the UE to unambiguously identify a particular signal by means of determining whether the signal contains the UE specific sequence or not. At a later stage, potentially triggered by a deteriorating link between the UE 2 and the source network node, the UE 2 may be ordered by the source network node 1 to either perform measurements of the quality on the downlinks from a set of potential target network nodes 3*b*, i.e. candidate access network nodes, or transmit a signal to enable the candidate target network nodes 3*b* to perform measurements of the quality on the uplink between the UE 2 and the candidate access network nodes. The source network node may obtain the measurement reports, related to either uplink measurements or downlink measurements, and determine a suitable target network node 3*a* among the set of candidate access network nodes based on the content of the measurement reports. It is possible that all candidate access network nodes has been provided with the UE specific sequence at an earlier time, e.g. at a time associated with the time when the UE established a radio link with the source network node, in this particular example however, the source network node 1 provides, in a step S1, the particular candidate access network node that were selected as a target network node 3*a* with a representation of a UE specific sequence. The target network node 3*a* may, after having obtained the representation of a UE specific sequence in a step S100, now either transmit, in a step S200, a signal that comprises the provided representation of a UE specific sequence, or it may be configured to utilize a particular mapping whereby the UE specific sequence is transformed into a particular sequence that is more suitable to transmit in a message and then transmit the message. In this particular example, the signal that comprises the representation of a UE specific sequence may also comprises a parameter that provides information on how, and/or when, the UE should respond. The message may be transmitted in the form of a layer-signal, it may for example be a reference signal. The message, or signal, transmitted from the target network node 3*a* is intended to be detected by the UE 2, and then identified, in a step S20, based on the representation of a UE specific sequence. The identification of the message may be done regardless of whether the UE specific sequence has been transformed or not. If it has been transformed the UE 2 needs to be configured to utilize a corresponding mapping, to the one used by the target network node 3*a*, to be able to identify the signal. Having identified the signal, the UE 2 may also extract the parameter comprised in the signal. This parameter may for example be a time and frequency resource conveying the information that the UE 2 should respond to the signal by transmitting, in a step S30, a message using the provided resources. This message is intended as an initiation of a radio link establishment between the UE 2 and the target network node 3*a*. The transmitted message may for example be a Physical Random Access Channel preamble, PRACH-preamble.

In the examples provided below the proposed mechanisms will be described in terms of a handover of a UE between two different cells. The described technology is however equally applicable for handover between radio access nodes, sectors or beams. The examples relates primarily to handover situations where the UE moves from one serving node, e.g., a serving base station or a serving radio access node, to another serving node. The examples also relates to the scenario where the source network node perform the method of the network equipment, i.e. there is in this particular example no virtualized or distributed functionality.

As has been explained earlier in this disclosure, one big issue in current HO procedure is that source network node cannot know which candidate target network node to select as target network node without receiving the measurement results from UE, and the UE cannot know which target network node, or which particular beam, to connect to until it receives the HO command from source network node. That is, the delay for a UE to know the target network node/beam may be long after UE starts to measure all the candidate nodes/beams. However, in NR, due to possible fast source radio link quality deterioration, UE may not be able to receive the HO command from source network node. Then UE has to start from the RLF procedure, Radio Link Failure procedure, which significantly affects HO performance.

According to a particular example of the proposed technology a main mechanism is that when the source network node trigger the handover procedure, i.e. instructs the UE to measure the beam quality from all candidate nodes/beams in Downlink based, DL based, handover procedure or, alternatively, let UE to transmit e.g. a USS, Uplink Synchronization Signal, toward all candidate nodes in UL based handover procedure, a designated L1 signal, preferably a reference signal, sometimes referred to as a mobility reference signal, MRS, may be defined for HO signaling. The source network node may configure the UE with such a designated MRS to detect in the handover trigger message before the source network node decides which candidate network node constitutes the target network node. The decision may be based on UE measurement report in a DL measurement based handover procedure or on measurement reports from all candidate nodes in an UL measurement based handover procedure. The UE can prepare to connect to or synchronize to the target according to the designated reference signal, e.g. the MRS, right after sending a measurement report to the source network node in a DL measurement based handover procedure or after sending a USS signature to all candidate node in UL measurement based handover procedure.

This may be explained further with this particular example. When the source network node sends a measurement trigger command to UE, the source network node may also include a designated reference signal, e.g. a Mobility Reference Signal, MRS, in the message and inform the UE that this will be the reference signal transmitted from the target network node.

After receiving the measurement reports from the UE for DL measurement based procedures, or receiving measurement reports from candidate nodes for UL measurement based procedures, the source network node may select the most appropriate or suitable target network node based on the reports and request the selected target network node to be prepared to accept the UE during a handover.

The source network node may in a particular example request that the target network node sends the designated reference signal to the UE. At the same time, the source network node may request the other nodes in the UE measurement report to not send the same designated reference signal, at least during a specific time period.

The UE may then attempt to detect the designated reference signal right after it sends out the measurement results to the source network node or after it sends out USS signature in the UL. As only the target network node will send the designated reference signal and as the other nodes, i.e. the remaining candidate target network nodes, will not transmit the signal, the UE will be able to identify the target network node and initiate an establishment procedure with the target network node. The designated reference signal, or some another designated L1 signal, sent from target network node may be seen as a handover command that will inform the UE to initiate an establishment procedure with the target network node, target AN. A beneficial aspect may be obtained in the case that the L1 signal is a special reference signal comprising built-in synchronization features, since the built-in synchronization features may be used by the UE to establish DL synchronization with regard to the target AN.

Having described various embodiments and examples of the cooperating methods in what follows a number of devices suitable to perform the methods will be described. The devices display the same advantages as was described in relation to the corresponding methods. These advantages will not be described again.

As used herein, the term “network equipment” or “network device” may refer to any equipment or device located in connection with a communication network, including but not limited to equipment/devices in access networks, core networks and similar network structures. The term network equipment or network equipment may also encompass cloud-based network equipment or network devices.

Since the network equipment 16 may be a cloud-based, a brief background to cloud-based functionality is provided below.

It is becoming increasingly popular to provide computing services hardware and/or software in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical nodes, i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

- Consolidation of network functionality into virtualized software running on customized or generic hardware. This is sometimes referred to as network function virtualization.
- Co-location of one or more application stacks, including operating system, running on separate hardware onto a single hardware platform. This is sometimes referred to as system virtualization, or platform virtualization.
- Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 13:
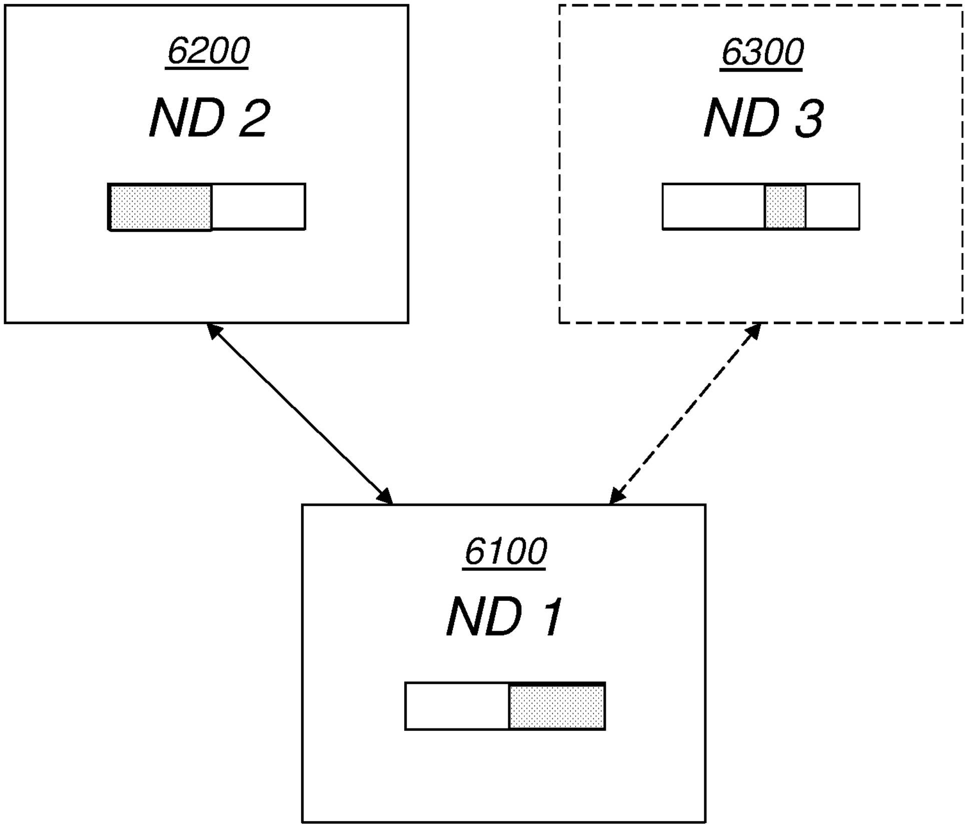
FIG. 13 is a schematic diagram illustrating an example of how functionality can be distributed or partitioned between different network devices, or network equipment.

FIG. 13 is a schematic diagram illustrating an example of how functionality can be distributed or partitioned between different network devices, or network equipment, in a general case. In this example, there are at least two individual, but interconnected network devices, ND1 and ND2, with reference numerals 6100 and 6200, respectively, which may have different functionalities, or parts of the same functionality, partitioned between the network devices 6100 and 6200. There may be additional network devices, such as ND3, with reference numeral 6300, being part of such a distributed implementation. The network devices 6100-6300 may be part of the same wireless communication system, or one or more of the network devices may be so-called cloud-based network devices located outside of the wireless communication system.

Figure 14:
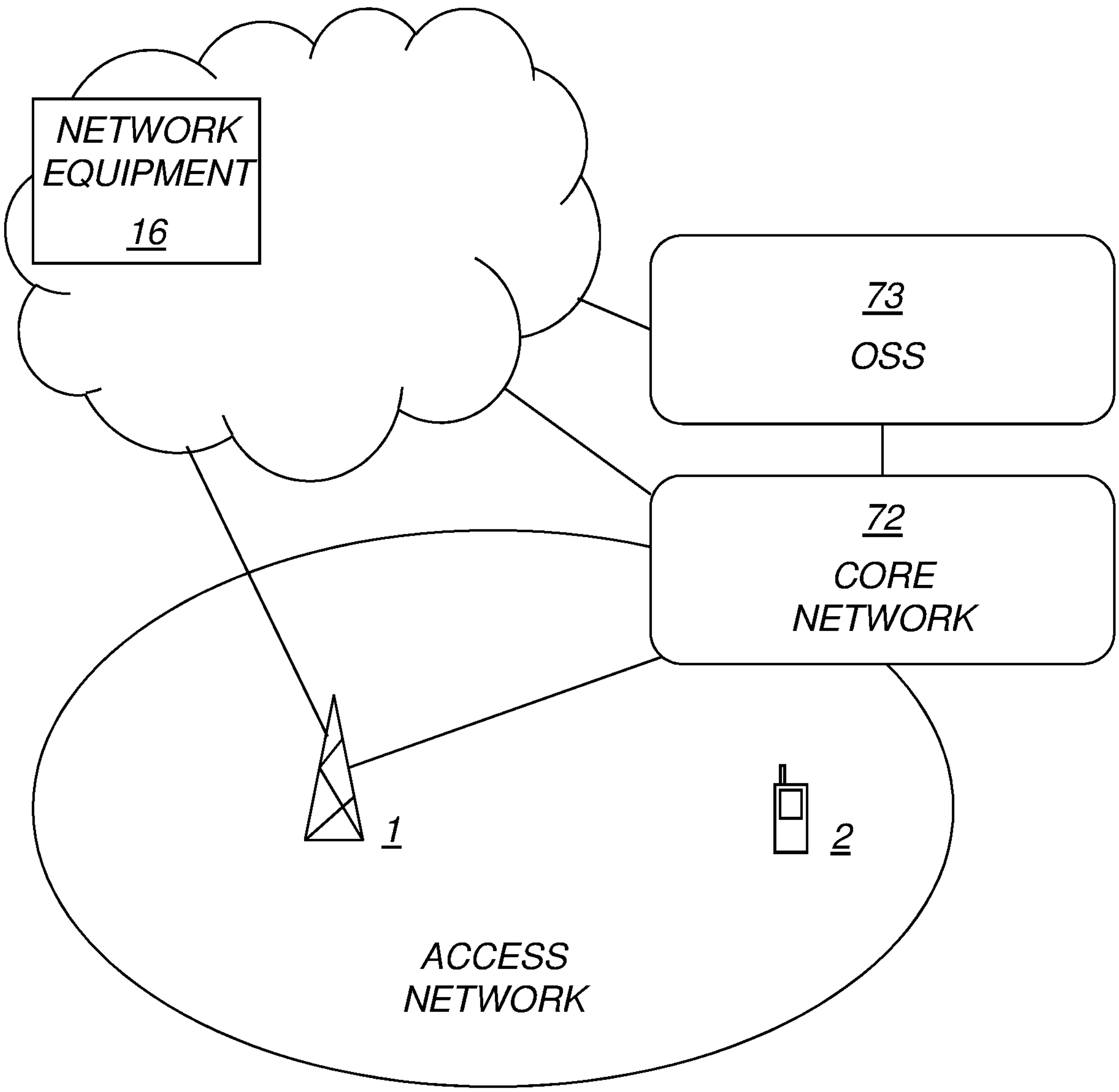
FIG. 14 is a schematic diagram illustrating an example of a wireless communication system, including an access network and/or a core network and/or an Operations and Support System OSS, in cooperation with one or more cloud-based network equipment.

FIG. 14 is a schematic diagram illustrating an example of a wireless communication system, including an access network and/or a core network 72 and/or an Operations and Support System OSS, 73 in cooperation with one or more cloud-based network equipment 16. Functionality relevant for the access network and/or the core network 72 and/or the OSS system 73 may be at least partially implemented for execution in a cloud-based network equipment 16, with suitable transfer of information between the cloud-based network equipment and the relevant network nodes and/or communication units in the access network and/or the core network and/or the OSS system.

A network equipment may generally be seen as an electronic device being communicatively connected to other electronic devices in the network.

By way of example, the network equipment may be implemented in hardware, software or a combination thereof. For example, the network equipment may be a special-purpose network equipment or a general purpose network device, or a hybrid thereof.

A special-purpose network equipment may use custom processing circuits and a proprietary operating system OS, for execution of software to provide one or more of the features or functions disclosed herein.

A general purpose network equipment may use common off-the-shelf COTS processors and a standard OS, for execution of software configured to provide one or more of the features or functions disclosed herein.

By way of example, a special-purpose network equipment may include hardware comprising processing or computing resources, which typically include a set of one or more processors, and physical network interfaces Nis, which sometimes are called physical ports, as well as non-transitory machine readable storage media having stored thereon software. A physical NI may be seen as hardware in a network equipment through which a network connection is made, e.g. wirelessly through a wireless network interface controller WNIC or through plugging in a cable to a physical port connected to a network interface controller NIC. During operation, the software may be executed by the hardware to instantiate a set of one or more software instances. Each of the software instances, and that part of the hardware that executes that software instance, may form a separate virtual network element.

By way of another example, a general purpose network equipment may for example include hardware comprising a set of one or more processors, often COTS processors, and network interface controllers NICs, as well as non-transitory machine readable storage media having stored thereon software. During operation, the processors executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system or a shim executing on a base operating system that allows for the creation of multiple software containers that may each be used to execute one of a sets of applications. In an example embodiment, each of the software containers also called virtualization engines, virtual private servers, or jails is a user space instance typically a virtual memory space. These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1 the virtualization layer represents a hypervisor sometimes referred to as a Virtual Machine Monitor VMM or the hypervisor is executed on top of a host operating system; and 2 the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instances. Each set of applications, corresponding software container if implemented, and that part of the hardware that executes them be it hardware dedicated to that execution and/or time slices of hardware temporally shared by software containers, forms a separate virtual network elements.

The virtual network elements may perform similar functionality compared to Virtual Network Elements VNEs. This virtualization of the hardware is sometimes referred to as Network Function Virtualization NFV. Thus, NFV may be used to consolidate many network equipment types onto industry standard high volume server hardware, physical switches, and physical storage, which could be located in data centers, NDs, and Customer Premise Equipment CPE. However, different embodiments may implement one or more of the software containers differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network equipment, which includes both custom processing circuitry/proprietary OS and COTS processors/standard OS in a network device, e.g. in a card or circuit board within a network equipment. In certain embodiments of such a hybrid network equipment, a platform Virtual Machine VM, such as a VM that implements functionality of a special-purpose network equipment, could provide for para-virtualization to the hardware present in the hybrid network equipment.

Having described some background of a cloud based equipment below will follow a description of a network equipment 16 according to the proposed technology.

The proposed technology provides a network equipment 16 that is configured to control handover of a User Equipment, UE, 2 from a source network node 1 to a target network node 3*a*. The network equipment 16 is configured to provide, for the UE 2 and for the target network node 3*a*, information comprising a representation of a UE specific sequence, wherein the UE specific sequence is to be incorporated in a signal, the signal to be transmitted by the target network node 3*a* to enable the UE 2 to initiate a radio link establishment procedure with the target network node 3*a* based on a reception of a signal comprising the UE specific sequence.

According to a particular embodiment of the proposed technology there is provided a network equipment 16, wherein the network equipment 16 is configured to provide the information comprising the UE specific sequence to at least the UE 2 when the UE 2 establishes a connection with the source network node 1.

According to a particular embodiment of the proposed technology there is provided a network equipment 16 that is configured to provide the information comprising the UE specific sequence to at least the target network node 3*a* based on the outcome of measurements of the quality of the links between the UE 2 and at least two candidate network nodes 3*a*, 3*b*, whereby the UE specific sequence is provided if the quality fulfills a specified criterion.

According to a particular embodiment of the proposed technology there is provided a network equipment 16, wherein the measurements relates to the quality on the uplink between the UE 2 and each of the candidate network nodes 3*a*; 3*b*.

According to a particular embodiment of the proposed technology there is provided a network equipment 16, wherein the measurements relates to the quality on the downlink between the UE 2 and each of the candidate network nodes 3*a*; 3*b*.

According to a particular embodiment of the proposed technology there is provided a network equipment 16, wherein the network equipment 16 is further configured to provide the information comprising the UE specific sequence to a plurality of candidate target network nodes 3*a*; 3*b*.

According to a particular embodiment of the proposed technology there is provided a network equipment 16, wherein the network equipment 16 is further configured to select, based on the outcome of measurements of the quality on the links between the UE 2 and at least two candidate network nodes 3*a*, 3*b*, a particular network node 3*a* that will act as a target network node and configured to inform the network node 3*a* that it has been selected as the target network node 3*a*.

According to a particular embodiment of the proposed technology there is provided a network equipment 16, wherein the network equipment 16 is configured to inform the candidate network nodes that were not selected to act as target network node 3*a* for the UE 2 to not transmit a signal comprising the UE specific sequence.

According to a particular embodiment of the proposed technology there is provided a network equipment 16, wherein the network equipment 16 is configured to provide information comprising a representation of a UE specific sequence and a parameter to be incorporated in the signal, the parameter enabling the UE 2 to establish a radio link with the target network node 3*a*.

According to a particular embodiment of the proposed technology there is provided a network equipment 16, wherein the parameter comprises a transmission time resource or a transmission time and frequency resource to be used by the UE 2 for transmitting a message to the target network node 3*a* to establish a radio link with the target network node 3*a*.

Figure 7:
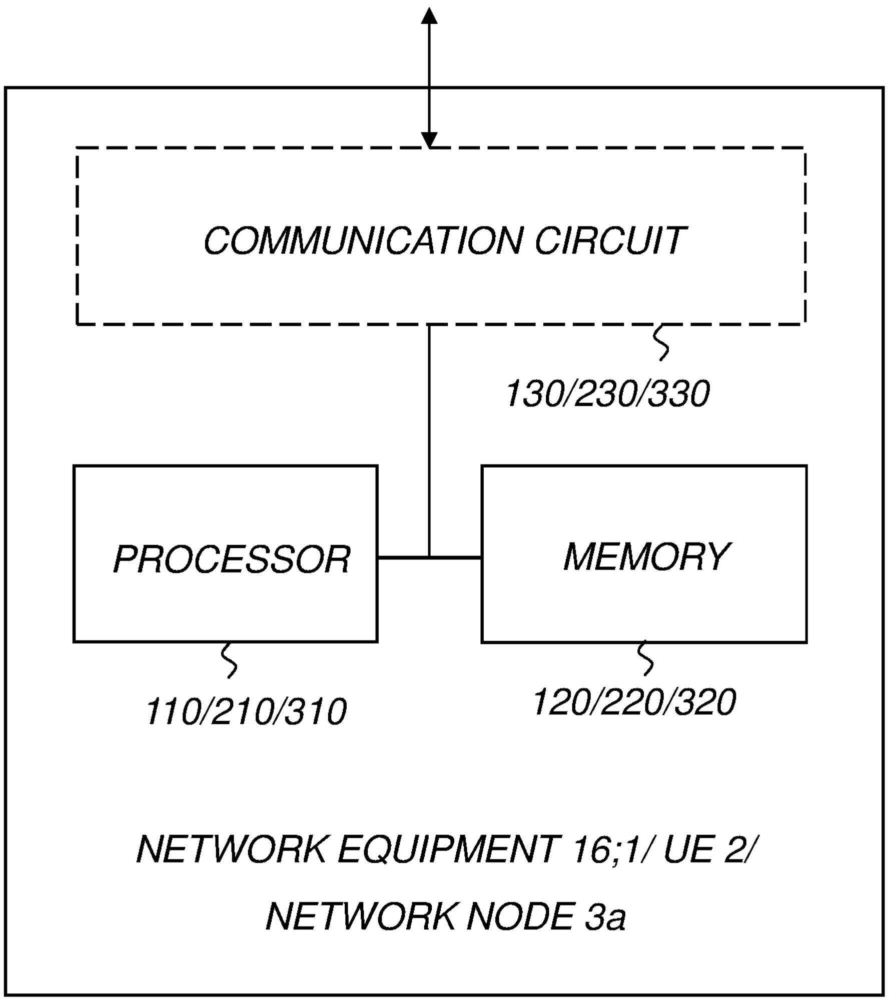
FIG. 7 is a block diagram illustrating a particular embodiment of a network equipment, a User Equipment and a network node according to the proposed technology. Since the structures of the network equipment, the User Equipment and the network node are similar, a single block diagram has been used to describe the all.

FIG. 7 is a schematic block diagram illustrating an example of a network equipment 16, based on a processor-memory implementation according to an embodiment. In this particular example, the equipment comprises a processor 110 and a memory 120, the memory 120 comprising instructions executable by the processor 110, whereby the processor is operative to control a handover of a User Equipment, UE, 2 from a source network node 1 to a target network node 3*a*. FIG. 7 also illustrates the scenario where the network equipment comprises the source network node 1. That is, the alternative scenario where the earlier described method for controlling handover is performed by the source network node 1.

Figure 8:
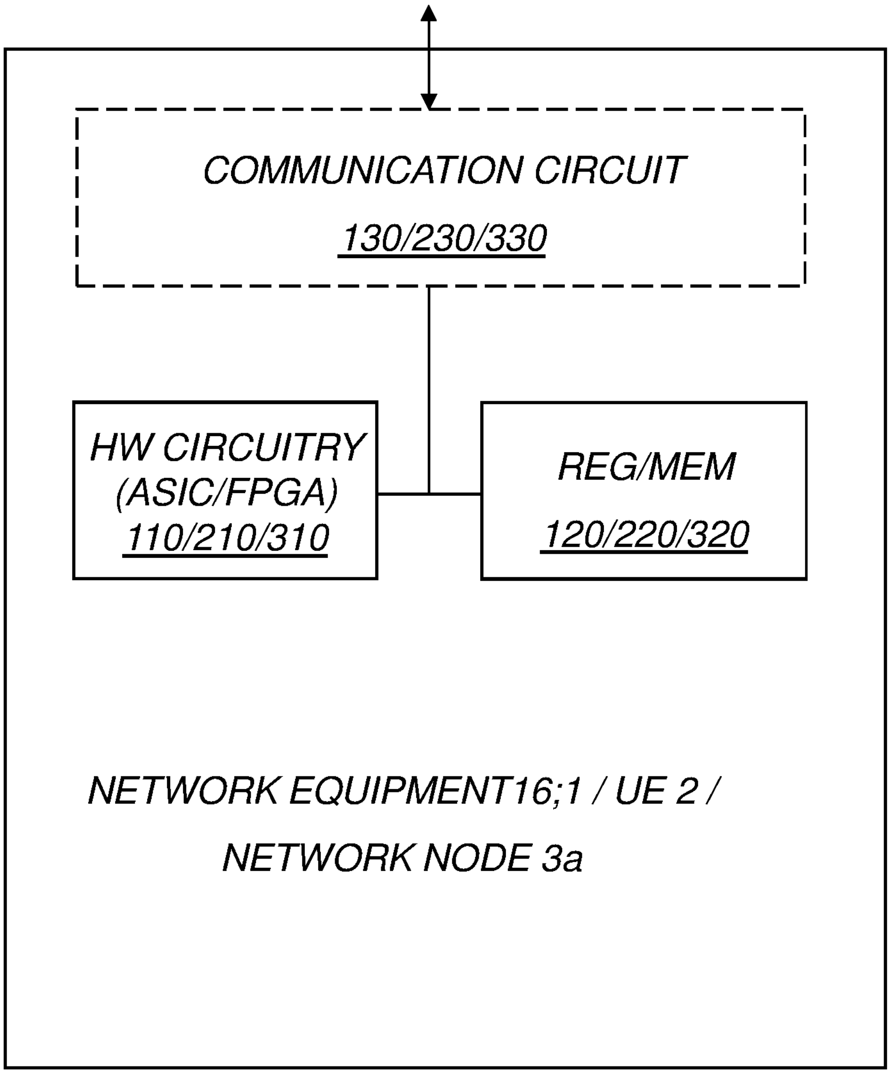
FIG. 8 is a block diagram illustrating an alternative embodiment of a network equipment, a User Equipment and a network node according to the proposed technology. Since the structures of the network equipment, the User Equipment and the network node are similar, a single block diagram has been used to describe the all.

FIG. 8 is a schematic block diagram illustrating another example of a network equipment 16, based on a hardware circuitry implementation according to an embodiment. Particular examples of suitable hardware circuitry 110 include one or more suitably configured or possibly reconfigurable electronic circuitry, e.g. Application Specific Integrated Circuits ASICs, Field Programmable Gate Arrays FPGAs, or any other hardware logic such as circuits based on discrete logic gates and/or flip-flops interconnected to perform specialized functions in connection with suitable registers REG and/or memory units MEM 120.

Optionally, the network equipment 16 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. Alternatively, with reference to FIG. 8, the communication circuit 130 may be interconnected to the hardware circuitry 110 and/or REG/MEM 120. By way of example, the communication circuit 130 may include any of the following: a receiver, a transmitter, a transceiver, input/output I/O circuitry, input ports and/or output ports.

According to a particular embodiment of the proposed technology there is provided a network equipment 16, wherein the network equipment 16 comprises the source network node 1. The descriptions provided above also relates to this particular embodiment.

According to a particular embodiment of the proposed technology the described network equipment 16 is a network equipment 16 that is configured to control a handover that comprises a beam switch.

Having described the network equipment 16 or the source network node 1 in detail, below a description of a network node 3*a*, or equivalently, a target network node 3*a* will follow.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base station functions such as Node Bs, or evolved Node Bs eNBs, and also macro/micro/pico radio base stations, home base stations, also known as femto base stations, relay nodes, repeaters, radio access points, Base Transceiver Stations BTSs, and even radio control nodes controlling one or more Remote Radio Units RRUs, or the like. The terms source network node and target network node are also referred to as source access network nodes and target access network nodes.

The proposed technology provides a network node 3*a* that are suitable to use, or adapted to work or operate, in a wireless communication network. The network node 3*a* is in particular adapted to operate during a handover of a User Equipment 2 from a source network node 1 to the network node 3*a*. The network node 3*a* is configured to obtain, from a network equipment 16, information comprising a representation of a UE specific sequence. The network node 3*a* is also configured to transmit a signal comprising the UE specific sequence to enable the UE 2 to identify the signal based on the UE specific sequence and establish a radio link with the network node 3*a* based on the identified signal.

According to a particular embodiment of the proposed technology there is provided a network node 3*a*, wherein the signal comprising the UE specific sequence further comprises a parameter enabling the UE to establish a connection with the target network node 3*a*.

According to a particular embodiment of the proposed technology there is provided a network node 3*a*, wherein the parameter is comprised in the information obtained from the network equipment 16.

According to a particular embodiment of the proposed technology there is provided a network node 3*a*, wherein the network node 3*a* is configured to transmit a signal comprising the UE specific sequence and the parameter, wherein the parameter comprises information enabling the UE 2 to identify the target network node 3*a*.

According to a particular embodiment of the proposed technology there is provided a network node 3*a*, wherein the parameter provides an explicit identification of the target network node 3*a*.

According to a particular embodiment of the proposed technology there is provided a network node 3*a*, wherein the parameter comprises a transmission time resource or a transmission time and frequency resource enabling the UE 2 to transmit a message according to the resources.

According to a particular embodiment of the proposed technology there is provided a network node 3*a*, wherein the network node 3*a* is further configured to receive, at resources associated with the transmission time or the transmission time and frequency resource provided to the UE 2, a message for establishing a radio link with the target network node 3*a*.

According to a particular embodiment of the proposed technology there is provided a network node 3*a*, wherein the wherein the network node 3*a* is configured to transmit a signal comprising the UE specific sequence and comprising Time/Frequency, T/F, synchronization features enabling the UE 2 to establish downlink synchronization with regard to the target network node 3*a*.

According to a particular embodiment of the proposed technology there is provided a network node 3*a*, wherein the transmitted signal comprising the UE specific sequence comprises a designated Layer 1 signal, L1-signal, preferably a reference signal.

According to a particular embodiment of the proposed technology there is provided a network node 3*a*, wherein the network node 3*a* is further configured to obtain the representation of the UE specific sequence from the network equipment 16 by receiving the representation of the UE specific sequence from the source network node 1.

FIG. 7 is a schematic block diagram illustrating an example of a network node 3*a*, based on a processor-memory implementation according to an embodiment. In this particular example, the network node 3*a* comprises a processor 310 and a memory 320, the memory 320 comprising instructions executable by the processor 310, whereby the processor is operative to control the network node 3*a* during handover of a User Equipment 2 from a source network node 1 to the network node 3*a*.

FIG. 8 is a schematic block diagram illustrating another example of a network node 3*a*, based on a hardware circuitry implementation according to an embodiment.

Particular examples of suitable hardware circuitry 310 include one or more suitably configured or possibly reconfigurable electronic circuitry, e.g. Application Specific Integrated Circuits ASICs, Field Programmable Gate Arrays FPGAs, or any other hardware logic such as circuits based on discrete logic gates and/or flip-flops interconnected to perform specialized functions in connection with suitable registers REG and/or memory units MEM 320.

The network node 3*a* may also include a communication circuit 330. The communication circuit 330 may include functions for wired and/or wireless communication with other devices and/or network nodes in the network. In a particular example, the communication circuit 330 may be based on radio circuitry for communication with one or more other nodes, including transmitting and/or receiving information. The communication circuit 330 may be interconnected to the processor 310 and/or memory 320. The communication circuit 330 may in another embodiment be interconnected to the hardware circuitry 310 and/or REG/MEM 320. By way of example, the communication circuit 330 may include any of the following: a receiver, a transmitter, a transceiver, input/output I/O circuitry, input ports and/or output ports.

According to a particular embodiment of the proposed technology there is provided a network node 3*a*, wherein the handover comprises a beam switch.

Below a description will be given of User Equipment 2 according to the proposed technology. A User Equipment is sometimes referred to as a wireless communication device or station, or even mobile station. As used herein, the non-limiting terms "wireless communication device", "station", "User Equipment UE", and "terminal" may refer to a mobile phone, a cellular phone, a Personal Digital Assistant PDA, equipped with radio communication capabilities, a smart phone, a laptop or Personal Computer PC, equipped with an internal or external mobile broadband modem, a tablet with radio communication capabilities, a target device, a device to device UE, a machine type UE or UE capable of machine to machine communication, Customer Premises Equipment CPE, Laptop Embedded Equipment LEE, Laptop Mounted Equipment LME, USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

According to the proposed technology there is provided a User Equipment, UE, 2 that is suitable to use, or adapted to work or operate, in a wireless communication network. The proposed technology provides in particular UE 2 that is configured to obtain, from a network equipment 16, information comprising a representation of a UE specific sequence. The UE 2 is also configured to identify, using the UE specific sequence, a signal from a target network node 3*a*. The UE 2 is also configured to transmit a message for establishing a radio link with the target network node 3*a* based on the identified signal.

According to a particular embodiment of the proposed technology there is provided a User Equipment, UE, 2, wherein the information comprising a representation of a UE specific sequence further comprises a parameter enabling the UE 2 to establish a connection with the target network node 3*a*.

According to a particular embodiment of the proposed technology there is provided a User Equipment, UE, 2, wherein the identified signal received from the target network node 3*a* comprises a parameter enabling the UE 2 to establish a connection with the target network node 3*a*.

According to a particular embodiment of the proposed technology there is provided a User Equipment, UE, 2, wherein the UE is configured to transmit a message for establishing a radio link with the target network node 3*a* message based on the parameter.

According to a particular embodiment of the proposed technology there is provided a User Equipment, UE, 2 wherein the parameter provides information enabling the UE 2 to identify the target network node 3*a*.

According to a particular embodiment of the proposed technology there is provided a User Equipment, UE, 2 wherein the parameter comprises an explicit identification of the target network node 3*a*.

According to a particular embodiment of the proposed technology there is provided a User Equipment, UE, 2, wherein the parameter comprises a transmission time resource or a transmission time and frequency resource and wherein the UE 2 is configured to transmit a message for establishing a radio link with the target network node 3*a* using the transmission time resource or the transmission time and frequency resource.

According to a particular embodiment of the proposed technology there is provided a User Equipment, UE, 2, wherein the received signal further comprises Time/Frequency, T/F, synchronization features enabling the UE 2 to establish downlink synchronization with regard to the target network node 3*a*.

According to a particular embodiment of the proposed technology there is provided a User Equipment, UE, 2 according to any of the claims, wherein the UE 2 is configured to receive a Layer 1-signal, L1-signal, preferably a reference signal, from a target network node 3*a*.

According to a particular embodiment of the proposed technology there is provided a User Equipment, UE, 2, wherein the UE 2 is configured to transmit a message that comprises Physical Random Access Channel preamble, PRACH-preamble.

According to a particular embodiment of the proposed technology there is provided a User Equipment, UE, 2, wherein the UE is configured to obtain the information comprising the representation of the UE specific sequence by receiving the information in a signal transmitted from the source network node 1.

According to a particular embodiment of the proposed technology there is provided a User Equipment, UE, 2, wherein the handover comprises a beam switch.

FIG. 7 is a schematic block diagram illustrating an example of a User Equipment 2, based on a processor-memory implementation according to an embodiment. In this particular example, the User Equipment 2 comprises a processor 210 and a memory 220, the memory 220 comprising instructions executable by the processor 210, whereby the processor is operative to control the User Equipment 2. The processor is in particular operative to control the User Equipment 2 during a handover procedure of the User Equipment 2.

FIG. 8 is a schematic block diagram illustrating another example of a User Equipment based on a hardware circuitry implementation according to an embodiment. Particular examples of suitable hardware circuitry 210 include one or more suitably configured or possibly reconfigurable electronic circuitry, e.g. Application Specific Integrated Circuits ASICs, Field Programmable Gate Arrays FPGAs, or any other hardware logic such as circuits based on discrete logic gates and/or flip-flops interconnected to perform specialized functions in connection with suitable registers REG and/or memory units MEM 220.

Optionally, the User Equipment 2 may also include a communication circuit 230. The communication circuit 230 may include functions for wired and/or wireless communication with other devices and/or network nodes in the network. In a particular example, the communication circuit 230 may be based on radio circuitry for communication with one or more other nodes, including transmitting and/or receiving information. The communication circuit 230 may be interconnected to the processor 210 and/or memory 220. The communication circuit 230 may be interconnected to the hardware circuitry 210 and/or REG/MEM 220. By way of example, the communication circuit 230 may include any of the following: a receiver, a transmitter, a transceiver, input/output I/O circuitry, input ports and/or output ports.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors DSPs, one or more Central Processing Units CPUs, video acceleration hardware, and/or any suitable programmable logic circuitry such as one or more Field Programmable Gate Arrays FPGAs, or one or more Programmable Logic Controllers PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

It is also possible to provide a solution based on a combination of hardware and software. The actual hardware-software partitioning can be decided by a system designer based on a number of factors including processing speed, cost of implementation and other requirements.

Figure 9:
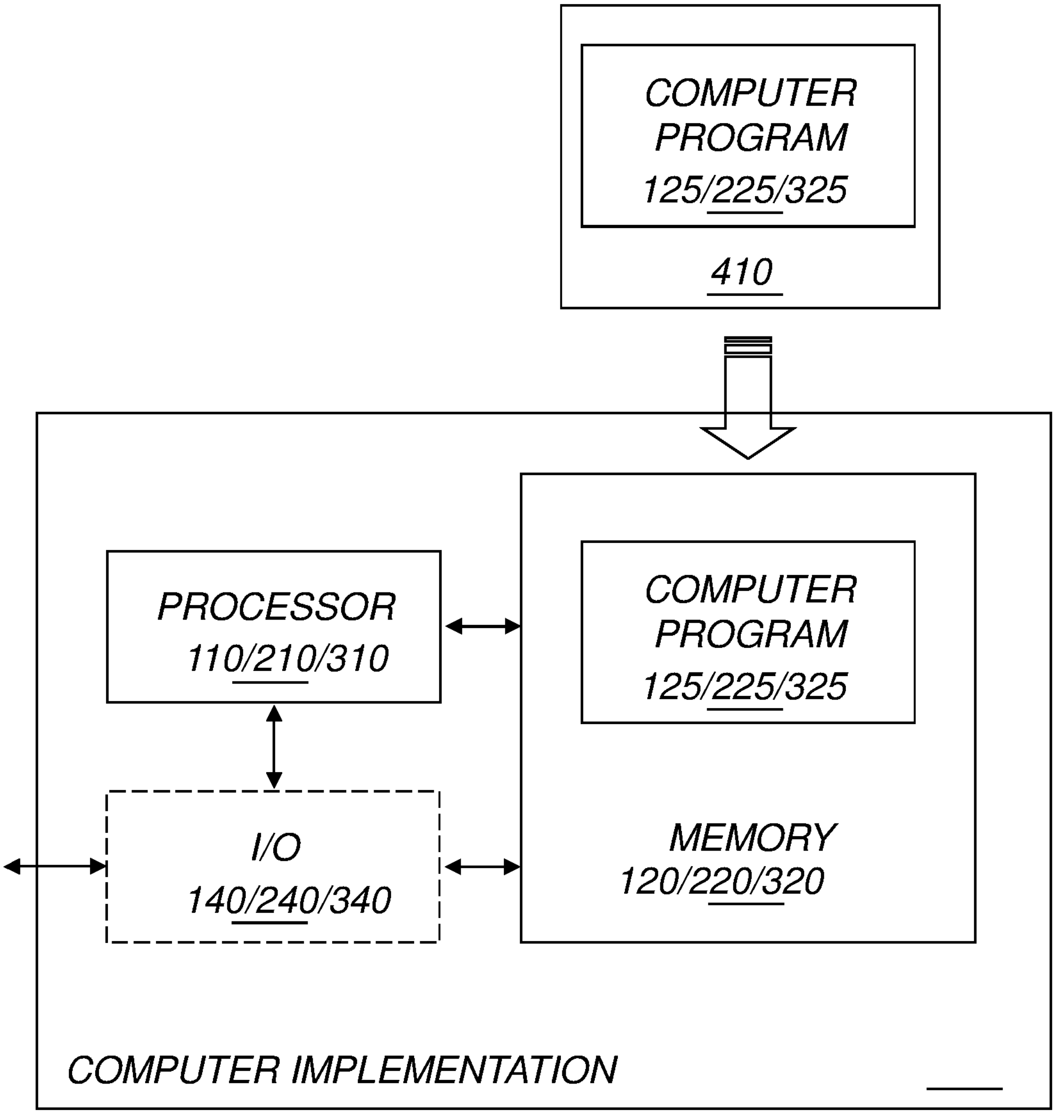
FIG. 9 is a block diagram illustrating a computer program implementation in a network equipment, a User Equipment or a network node according to the proposed technology.

FIG. 9 is a schematic diagram illustrating an example of a computer-implementation according to an embodiment. In this particular example, at least some of the steps, functions, procedures, modules and/or blocks described herein are implemented in a computer program 125; 225; 325, which is loaded into the memory 120; 220; 320 for execution by processing circuitry including one or more processors 110; 210; 310. The processors 110; 210; 310 and memory 120; 220; 320 are interconnected to each other to enable normal software execution. An optional input/output device 140; 240; 340 may also be interconnected to the corresponding processor and/or the memory to enable input and/or output of relevant data such as input parameters and/or resulting output parameters.

The term 'processor' should be interpreted in a general sense as any system or device capable of executing program code or computer program instructions to perform a particular processing, determining or computing task.

The processing circuitry including one or more processors 110; 210; 310 is thus configured to perform, when executing the computer program 125; 225; 325, well-defined processing tasks such as those described herein.

The processing circuitry does not have to be dedicated to only execute the above-described steps, functions, procedure and/or blocks, but may also execute other tasks.

According to a particular aspect of the proposed technology there is provided a computer program 125 to be used by the network equipment 16 for controlling handover of a User Equipment 2 from a source network node 1 and a target network node 3*a*.

In this particular embodiment, the computer program 125 comprises instructions, which when executed by at least one processor, cause the at least one processor to:

- generate information comprising a representation of a UE specific sequence, the UE specific sequence to be incorporated in a signal transmitted by a target network node 3*a* to enable a UE 2 to initiate a radio link establishment procedure with the target network node 3*a* based on a reception of a signal comprising the UE specific sequence; and
- output the information comprising the representation of a UE specific sequence to enable the information to be provided to a UE 2 and to a target network node 3*a*.

According to another aspect of the proposed technology there is provided a computer program 225 to be used for controlling a User Equipment 2 during a handover from a source network node 1 to a target network node 3*a*.

In this particular embodiment, the computer program 225 comprises instructions, which when executed by at least one processor, cause the at least one processor to:

- read information comprising a representation of a UE specific sequence; and
- read information content of a received signal; and
- identify a signal from a target network node 3*a* by comparing the read UE specific sequence with the read information content of the received signal; and
- output a message to be transmitted for establishing a radio link with the target network node 3*a* based on the identified signal.

According to the proposed technology there is also provided a computer program for controlling a network node 3*a* during a handover procedure of a User Equipment 2 from a source network node 1 to the network node 3*a*.

It is therefore provided a computer program 325 that comprises instructions, which when executed by at least one processor, cause the at least one processor to:

- read information comprising a representation of a UE specific sequence; and
- output the content of a signal comprising the UE specific sequence to enable a UE 2 to identify the signal based on the UE specific sequence and establish a radio link with the network node 3*a* based on the identified signal.

The proposed technology also provides a carrier comprising any of the computer programs 125; 225; 325 described above, wherein the carrier is one of an electronic signal, an optical signal, an electromagnetic signal, a magnetic signal, an electric signal, a radio signal, a microwave signal, or a computer-readable storage medium.

By way of example, the software or computer program 125; 225; 325 may be realized as a computer program product, which is normally carried or stored on a computer-readable medium 410, in particular a non-volatile medium. The computer-readable medium may include one or more removable or non-removable memory devices including, but not limited to a Read-Only Memory ROM, a Random Access Memory RAM, a Compact Disc CD, a Digital Versatile Disc DVD, a Blu-ray disc, a Universal Serial Bus USB memory, a Hard Disk Drive HDD storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein. The proposed technology provide apparatuses comprising such modules.

Figure 10:
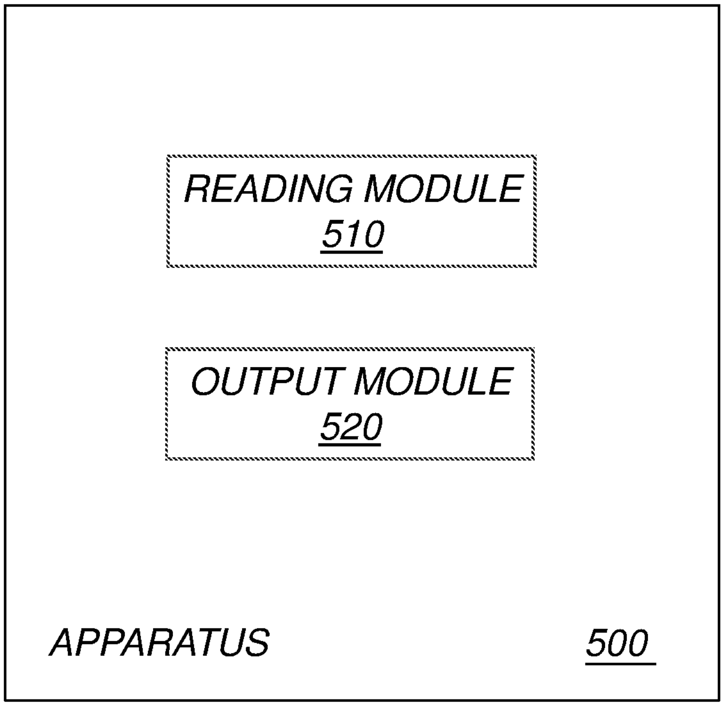
FIG. 10 is a diagram illustrating an apparatus according to the proposed technology.

FIG. 10 is a schematic diagram illustrating an example of an apparatus 500 for controlling handover of a User Equipment, UE, 2 from a source network node 1 to a target network node 3*a*. The apparatus comprises:

- a processing module 510 for generating information comprising a representation of a UE specific sequence, the UE specific sequence to be incorporated in a signal transmitted by a target network node 3*a* to enable a UE to initiate a radio link establishment procedure with the target network node 3*a* based on a reception of a signal comprising the UE specific sequence; and an output module 520 for outputting the information comprising the representation of a UE specific sequence to enable the information to be provided to a UE 2 and a target network node 3*a*.

Figure 11:
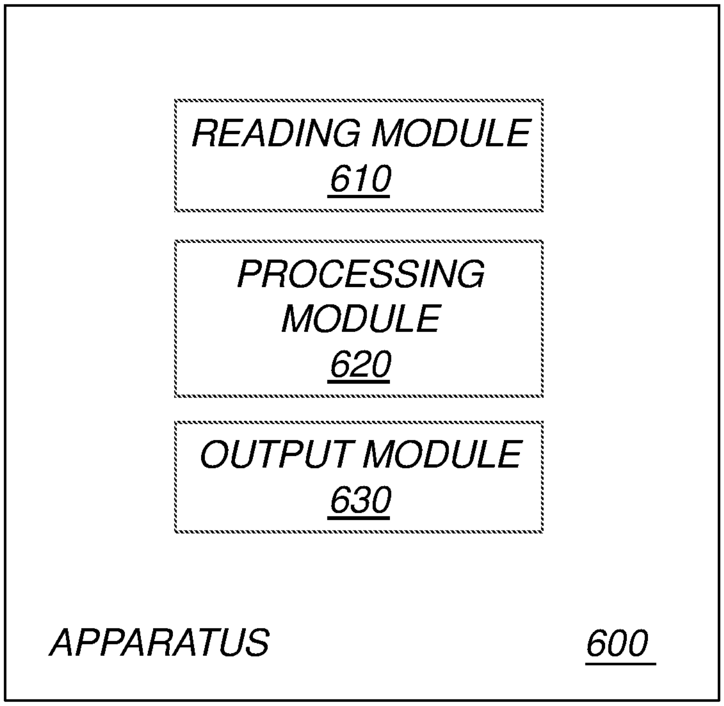
FIG. 11 is a diagram illustrating an apparatus according to the proposed technology.

FIG. 11 is a schematic diagram illustrating an example of an apparatus 600 for controlling a radio link establishment with a target network node 3*a*. The apparatus comprises:

a reading module 610 for reading information comprising a representation of a UE specific sequence; and a reading module 610 for reading the information content of a received signal; and a processing module 620 for identifying a signal from a target network node 3*a* by comparing the read UE specific sequence with the read information content of the received signal; and an output module 630 for outputting a message to be transmitted for establishing a radio link with the target network node 3*a* based on the identified signal.

Figure 12:
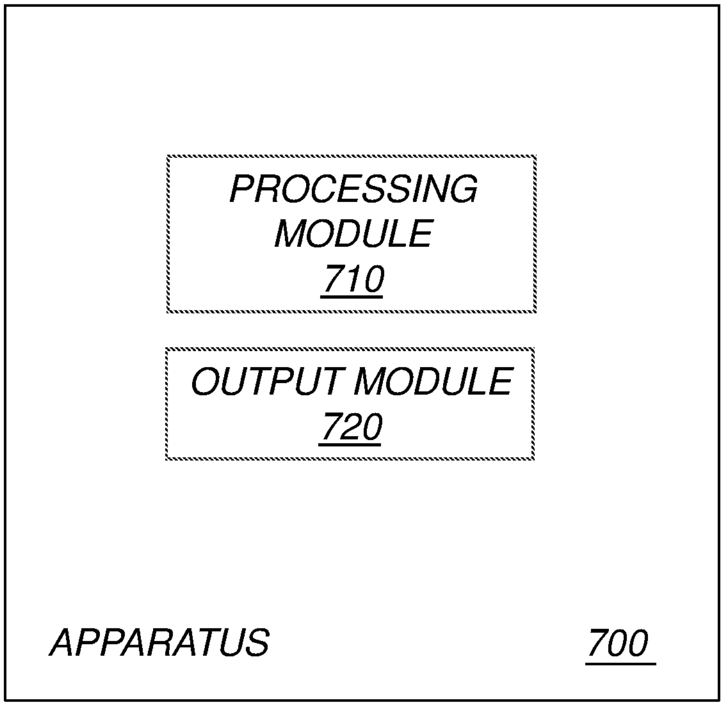
FIG. 12 is a diagram illustrating an apparatus according to the proposed technology.

FIG. 12 is a schematic diagram illustrating an example of an apparatus 700 for enabling a radio link establishment between a User Equipment 2 and a network node 3*a* during handover of the User Equipment from a source network node 1 to the network node 3*a*. The apparatus comprises:

a reading module 710 for reading information comprising a representation of a UE specific sequence; and an output module 720 for outputting the content of a signal comprising the UE specific sequence, the signal to be transmitted to enable a UE 2 to identify the signal based on the UE specific sequence and establish a radio link with the network node 3*a* based on the identified signal.

Alternatively, it is possible to realize the modules in FIGS. 10-12 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits ASICs as previously mentioned. Other examples of usable hardware include input/output I/O circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

What is claimed is:

1. A method performed by a network equipment for controlling a handover of a User Equipment (UE) from a source network node to a target network node, the method comprising:

providing, for the UE and for the target network node, information comprising a parameter and a representation of a UE-specific sequence, wherein the parameter and the UE-specific sequence are to be incorporated in a signal, said signal to be transmitted by the target network node to enable the UE to initiate a radio link establishment procedure with the target network node based on a reception of the signal comprising said parameter and said UE-specific sequence, and wherein the parameter comprises a transmission time resource or a transmission time and frequency resource and further comprises information enabling the UE to identify the network node.

2. The method of claim 1, wherein the information comprising the parameter and the representation of the UE-specific sequence is provided to at least the UE when the UE establishes a connection with the source network node.

3. The method of claim 1, wherein said parameter enables said UE to establish a radio link with the target network node.

4. The method of claim 3, wherein said parameter is used by the UE for transmitting a message to the target network node to establish the radio link with the target network node, and wherein transmitting the message to the target network node to establish the radio link with the target network node comprises transmitting a Physical Random Access Channel (PRACH) preamble.

5. The method of claim 1, wherein said network equipment comprises the source network node.

6. A method for operating a network node in a wireless communication network during a handover of a User Equipment (UE) from a source network node to the network node, the method comprising:

obtaining, from a network equipment, information comprising a parameter and a representation of a UE-specific sequence, wherein the parameter comprises a transmission time resource or a transmission time and frequency resource and further comprises information enabling the UE to identify the network node; and transmitting a signal comprising said parameter and said UE-specific sequence to enable the UE to identify the signal based on the UE-specific sequence and initiate, in response to the identification, a procedure for establishing a radio link with the network node.

7. The method of claim 6, wherein the parameter enables the UE to establish a connection with the network node.

8. The method of claim 7, wherein said parameter comprises information enabling the UE to identify the network node.

9. The method of claim 7, wherein the parameter enables the UE to transmit a message according to said transmission time resource or said transmission time and frequency resource, to establish the radio link with the network node, and wherein the transmission of the message to establish the radio link with the network node comprises transmission of a Physical Random Access Channel (PRACH) preamble.

10. A network equipment configured to control a handover of a User Equipment (UE) from a source network node to a target network node, wherein the network equipment is configured to:

provide, for the UE and for the target network node, information comprising a parameter and a representation of a UE-specific sequence, wherein the parameter and the UE-specific sequence are to be incorporated in a signal, said signal to be transmitted by the target network node to enable the UE to initiate a radio link establishment procedure with the target network node based on a reception of the signal comprising said parameter and said UE-specific sequence, and wherein the parameter comprises a transmission time resource or a transmission time and frequency resource and further comprises information enabling the UE to identify the network node.

11. The network equipment of claim 10, wherein the network equipment is configured to provide the information comprising the parameter and the representation of the UE-specific sequence to at least the UE when the UE establishes a connection with the source network node.

12. The network equipment of claim 10, wherein said parameter enables said UE to establish a radio link with the target network node.

13. The network equipment of claim 12, wherein said parameter is used by the UE for transmitting a message to the target network node to establish the radio link with the target network node, and wherein transmitting the message to the target network node to establish the radio link with the target network node comprises transmitting a Physical Random Access Channel (PRACH) preamble.

14. The network equipment of claim 10, wherein said network equipment comprises the source network node.

15. A network node configured to operate during a handover of a User Equipment (UE) from a source network node to the network node, wherein the network node is configured to:

obtain, from a network equipment, information comprising a parameter and a representation of a UE-specific sequence, wherein the parameter comprises a transmission time resource or a transmission time and frequency resource and further comprises information enabling the UE to identify the network node; and the network node is configured to transmit a signal comprising said parameter and said UE-specific sequence to enable the UE to identify the signal based on the UE-specific sequence and initiate, in response to the identification, a procedure for establishing a radio link with the network node.

16. The network node of claim 15, wherein the parameter enables the UE to establish a connection with the network node.

17. The network node of claim 16, wherein said parameter comprises information enabling the UE to identify the network node.

18. The network node of claim 16, wherein the parameter enables the UE to transmit a message according to said transmission time resource or transmission time and frequency resource to establish the radio link with the network node, and wherein the transmission of the message to establish the radio link with the network node comprises transmission of a Physical Random Access Channel (PRACH) preamble.

* * * * *